United States Patent [19]
Nagata et al.

[11] Patent Number: 5,883,483
[45] Date of Patent: Mar. 16, 1999

[54] INDUCTANCE L LOAD ACTUATING APPARATUS

[75] Inventors: Junichi Nagata; Junji Hayakawa, both of Okazaki; Hiroyuki Ban, Aichi-ken, all of Japan

[73] Assignee: Denso Corporation, Kariya, Japan

[21] Appl. No.: 743,878

[22] Filed: Nov. 6, 1996

[30] Foreign Application Priority Data

| Nov. 6, 1995 | [JP] | Japan | 7-287595 |
| Dec. 27, 1995 | [JP] | Japan | 7-341277 |
| Apr. 15, 1996 | [JP] | Japan | 8-092747 |

[51] Int. Cl.$^6$ ............... H02P 8/12
[52] U.S. Cl. .............. 318/696; 318/492
[58] Field of Search ............ 318/685, 696, 318/138, 254, 439, 701, 702, 492

[56] References Cited

U.S. PATENT DOCUMENTS

| 3,671,826 | 6/1972 | Newell | 318/138 |
| 3,956,678 | 5/1976 | Byrne et al. | 318/138 |
| 4,506,207 | 3/1985 | Ferrari | 318/696 |
| 4,513,236 | 4/1985 | Kikukawa et al. | |
| 4,514,675 | 4/1985 | Matumoto et al. | 318/696 |

FOREIGN PATENT DOCUMENTS

| 7-033598 | 7/1995 | Japan. |
| 7-075479 | 8/1995 | Japan. |

*Primary Examiner*—Bentsu Ro
*Attorney, Agent, or Firm*—Pillsbury Madison & Sutro LLP

[57] ABSTRACT

In an actuation circuit for a stepping motor, one switching element and its associated coil are connected at one connecting point, while the other switching element and its associated coil are connected at another connecting point. A pair of switching circuits and a pair of rectifying circuits are provided between two connecting points. When one of switching elements is changed from an ON condition to an OFF condition, the voltage difference between two connecting points allows the current to flow in a designated direction through the switching circuit and the rectifying circuit combined, thereby releasing the energy stored in the coils.

11 Claims, 25 Drawing Sheets

INDUCTANCE L LOAD ACTUATING APPARATUS

BACKGROUND OF THE INVENTION

1. Field of the Invention

This invention relates to an inductance L load actuating apparatus that actuates an inductance L load of a stepping motor or the like.

2. Related Art

A conventionally known apparatus, as this kind of apparatus, is for example disclosed in the Japanese Utility Model No. HEI 7-33598, published in 1995. The stepping motor apparatus, disclosed in this prior art, reference will be explained in greater detail hereinafter.

FIG. 22 shows an actuation circuit for a bipolar winding 2-phase stepping motor. A direct-current power source unit 1, generating a voltage Vcc, is connected to each of first coil 2a to fourth coil 2d. These first coil 2a to fourth coil 2d are connected to first to fourth switching elements (MOS transistors) 3a to 3d, respectively.

A first current-detection resistance 4a is connected between a common connecting point of switching elements 3a, 3c and the ground. A diode 5a is connected in parallel to the first current-detection resistor 4a for forming a current path for discharging energy stored in the coil. In the same manner, a second current-detection resistance 4b is connected between a common connecting point of switching elements 3b, 3d and the ground. A diode 5b is connected in parallel to the second current-detection resistor 4b.

Responding to exciting current signals supplied through output lines 7a and 7b of an exciting signal generation circuit 7, first and second control circuits 6a and 6b, respectively control the switching elements 3a to 3d in accordance with a predetermined exciting method (e.g. 2-phase exciting method). More specifically, control circuit 6a compares the current detection signal obtained from a detection line 8 connected to the first current-detection resistance 4a with a reference voltage V1 produced from a reference voltage generation circuit 10, and executes the intermittent control (i.e. chopping control) for the associated switching elements 3a and 3c. Similarly, control circuit 6b compares the current detection signal obtained from a detection line 9 connected to the second current-detection resistance 4b with a reference voltage V2 produced from the reference voltage generation circuit 10, and executes the intermittent control (i.e. chopping control) for the associated switching elements 3b and 3d. Through the above-described chopping control, a stepping motor is actuated by a constant current.

FIG. 23 shows waveforms of various portions of the above-described actuation circuit obtained when the stepping motor is actuated by the two-phase exciting method. Waveforms (A) and (B) represent exciting signals, while waveforms (C) through (F) represent gate signals of switching elements 3a through 3d, respectively. When the exciting signal shown by the waveform (A) is in HIGH level, switching element 3a is subjected to the chopping control. When the exciting signal shown by the waveform (B) is in HIGH level, switching element 3b is subjected to the chopping control. Furthermore, when the exciting signal shown by the waveform (A) is in LOW level, switching element 3c is subjected to the chopping control. When the exciting signal shown by the waveform (B) is in LOW level, switching element 3d is subjected to the chopping control.

Control circuits 6a and 6b have the same arrangement. FIG. 24 shows the detailed arrangement of control circuit 6a. Operation of control circuit 6a, during an exciting period for generating a signal to activate coil 2c, will be explained with reference to the timing chart of FIG. 25.

When switching element 3c is in an ON condition, the voltage applied between both ends of current-detection resistance 4a, i.e. current-detection voltage Vr, becomes a positive voltage in proportion to the current flowing through this resistance 4a during its ON period. On the other hand, when switching element 3c in an OFF condition, current-detection voltage Vr is equalized to the forward voltage drop of diode 5a. Accordingly, as shown by the waveform (A) of FIG. 25, current-detection voltage Vr varies in response to ON and OFF of switching element 3c.

A comparator 61 compares the current-detection voltage Vr with the reference voltage V1. When the current-detection voltage Vr reaches to the reference voltage V1, the output of comparator 61 is turned to LOW level. Thus, a capacitor 62 is discharged. When the current-detection voltage Vr is smaller than the reference voltage V1, the output of comparator 61 is in HIGH level. Thus, capacitor 62 is charged. The terminal voltage $V_{62}$ of capacitor 62, hence, varies as indicated by the waveform (B) of FIG. 25. This voltage $V_{62}$ is compared with a predetermined reference voltage $V_0$ at a comparator 63, and is converted into a pulse signal $V_{63}$ as shown by the waveform of FIG. 25. This pulse signal $V_{63}$ is level-inverted through a NOT circuit 64.

In an exciting period of coil 2c, the signal produced from exciting signal generation circuit 7 is in LOW level and the output of NOT circuit 66 is in HIGH level. Hence, the pulse signal is supplied to switching element 3c through AND circuit 65. A voltage $V_{GS}$, having the waveform (D) of FIG. 25, is applied between the gate and the source of switching element 3c.

Accordingly, as shown by waveforms (A) through (D), when the switching element 3c is turned on at the time t1 and the current-detection voltage Vr has reached the reference voltage V1, the output of AND circuit 65 is turned to LOW level and the switching element 3c is turned off. Thereafter, capacitor 62 is charged. When the terminal voltage $V_{62}$ reaches the reference voltage $V_0$ at the time t2, the output of AND circuit 65 is turned to HIGH level and switching element 3c is turned on. By repeating this operation, switching element 3c is subjected to the chopping control.

During the ON period (t2 to t3) of switching element 3c, current Ic shown by the waveform (E) of FIG. 25 flows through a circuit consisting of power source unit 1, coil 2c, switching element 3c, current-detection circuit 4a and the ground. During the OFF period (t1 to t2) of switching element 3c, energy stored by the excitement of coil 2c is discharged through coil 2a which is electromagnetically coupled with this coil 2c. In other words, current Ia flows through a circuit consisting of coil 2a, power source unit 1, bypass diode 5a and a built-in diode of switching element 3a. When the flowing direction of current Ia is defined by the arrow shown in FIG. 24, current Ia has the waveform (F) shown in FIG. 25. The composite current I of current Ic and current Ia is shown by the waveform (G) of FIG. 25.

The above-described operation is performed in the exciting period of any other coils 2a, 2b and 2d, in the same manner as in the exciting period of coil 2c.

As described above, current Ic flows in response to turning-on operation of switching element 3c. In this case, a voltage Vc (refer to the waveform (H) of FIG. 25) at a connecting point C between switching element 3c and coil 2c is a low-level voltage equivalent to the sum of an ON-voltage of switching element 3c and current-detection voltage Vr. A voltage Va (refer to the waveform (I) of FIG. 25) at a connecting point A between switching element 3a and coil 2a becomes a high-level voltage induced in proportion to the gradient of current Ic due to mutual induction between activated coil 2c and coil 2a.

When switching element 3c is turned to the OFF condition, the voltage Vc is increased to the high-voltage level by the energy stored based on the excitement of coil 2c. At the same time, in the coil 2a paired with coil 2c, a negative voltage is caused with a voltage drop equivalent to voltage Va by the energy stored in coil 2c. As a result, switching element 3a, having being set in the cutoff condition, is turned on with inverse bias, thereby supplying exciting current to coil 2a.

Accordingly, when switching element 3c is turned off, energy stored in coil 2c is discharged only through the coil 2a which is paired with coil 2a.

With the above-described operation, according to the above-described conventional system, voltage Vc at the connecting point C is increased up to a very high-voltage level in response to the transition of switching element 3c from ON to OFF. For this high voltage, it is necessary to increase the withstand voltage of switching elements 3a through 3d. Furthermore, emissive noise may be caused by the high-voltage surge.

SUMMARY OF THE INVENTION

Accordingly, in view of above-described problems encountered in the related art, a principal object of the present invention is to provide an inductance L load actuating apparatus which is capable of reducing the voltage at the above-described connecting point.

In order to accomplish this and other related objects, the present invention provides a novel and excellent inductance L load actuating apparatus having various aspects which will be described hereinafter together with reference numerals in parentheses which show the correspondence to the components of the preferred embodiments of the present invention described later.

According to the first aspect of the present invention, the first inductance L load (2a) and the first switching element, (3a) are connected at the first connecting point (A), while the second inductance L load (2c) and the second switching element (3c) are connected at the second connecting point (C). Current path forming means (11 through 14) is also provided to form a current path between the first connecting point (A) and the second connecting point (B) when one of the first and second switching elements is changed from an ON condition to an OFF condition. The current path is formed by a voltage difference between the first connecting point and the second connecting point so as to allow current to flow from the connecting point corresponding to one of first and second switching elements to the connecting point corresponding to the other of first and second switching elements.

Accordingly, when one switching element is turned off, the voltage at the connecting point corresponding to this switching element is increased by the energy stored in the inductance L load having been excited by the ON operation of this one switching element. On the other hand, the voltage of the connecting point corresponding to the other switching element is lowered. The difference voltage caused therebetween allows the current to flow from the connecting point of the one switching point to the connecting point of the other switching point.

With the current path thus formed, it becomes possible to suppress the voltage increase at the connecting point corresponding to the one switching element. And, the withstand voltage of the switching element can be lowered.

Furthermore, for the inductance L load actuation, it is possible to use the chopping control. In this case, the above-described current path can be formed when one switching element is changed from an ON condition to an OFF condition in the chopping control.

Furthermore, it is preferable that the current path forming means comprises first switching means (11) which is turned on in response to the actuation of the first switching element (3a), and second switching means (12) which is turned on in response to the actuation of the second switching element (3c).

Moreover, it is preferable that the current path forming means further comprises first rectifying means (13) which rectifies the current to flow from the first connecting point (A) to the second connecting point (C) when the first switching means (11) is turned on, and second rectifying means (14) which rectifies the current to flow from the second connecting point (C) to the first connecting point (A) when the second switching means (12) is turned on. By providing these rectifying means, it becomes possible to prevent the current from flowing in the opposite direction along the current path when the one switching element is switched from an OFF condition to an ON condition. Thus, the actuation circuit operates appropriately.

Furthermore, it is preferable that the first and second switching means are constituted by first and second MOS transistors (11b, 12b), and first and second diodes (13b, 14b) incorporated in the first and second MOS transistors serve as the first and second rectifying means.

In this case, erroneous operation due to noise can be reduced by fixing an electrical potential of the connecting point between the first and second MOS transistors.

Still further, it is preferable to provide the charging means (18a, 18c etc.) which charges the gate of the first MOS transistor (11b) by using the voltage of the second connecting point (C) when the first switching element (3a) is turned on, and also charges the gate of the second MOS transistor (12b) by using the voltage of the first connecting point (A) when the second switching element (3c) is turned on. With this arrangement, it becomes possible to produce the gate voltage by utilizing the voltage at the connecting point being in the deactivated condition. Hence, the first and second MOS transistors can be turned on without supplying the gate voltage from an external power source.

Still further, it is preferable to provide discharging means (24a, 24c) which grounds the gates of the first and second MOS transistor (11b, 12b). With this discharging means, the first and second MOS transistors can be operated adequately.

Yet further, according to the features of the preferred embodiments of the present invention, the first and second inductance L loads are exciting coils, and the prohibition means (40a, 40c, 50a, 50c, 60a, 61a, 60c, 61c) is provided to prevent one of the first and second switching elements from being activated until the current flowing through the current path is reduced to a predetermined value, at the time the exciting coils are switched by switching one of first and second switching elements from a deactivated condition to an activated condition and switching the other of the first and second switching elements from an activated condition to a deactivated condition.

Accordingly, in the switching operation of the exciting coils, it becomes possible to prevent the current from flowing through the current path into the switching element, thereby preventing the increase of power consumption.

In this case, the gate voltage of the MOS transistor, serving as the switching means having being in an ON condition can be used to detect whether the current flowing through the current path has decreased to the predetermined value. It is also possible to use the source-drain voltage of the MOS transistor being in an OFF condition for detecting the same.

Moreover, according to the second aspect of the present invention, the current supply means (11 through 14) converts the energy of one of the first and second inductance L loads (2a, 2c) stored in response to ON operation of one of the first and second switching elements into current, at the time the one of first and second switching elements is changed from an ON condition to an OFF condition, and supplies this current to the other of the first and second inductance L loads. In this case, the same effect as the first aspect invention can be obtained.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1:
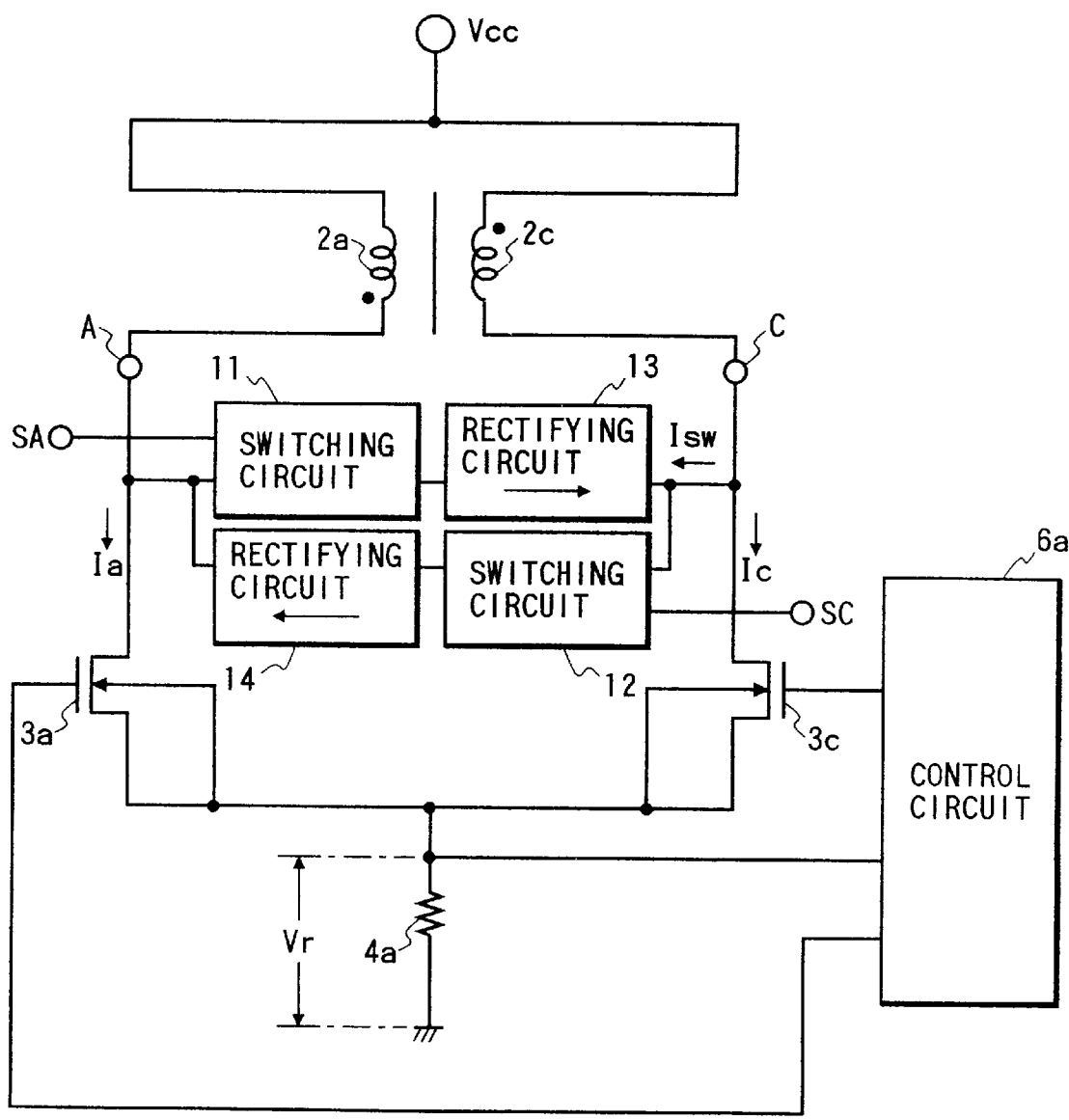
FIG. 1 is a circuit diagram showing an actuation circuit for a stepping motor in accordance with a first embodiment of the present invention.

Preferred embodiments of the present invention will be explained in greater detail hereinafter with reference to the accompanying drawings. Identical parts are denoted by the same reference numerals throughout the views.

Embodiment 1

Figure 22:
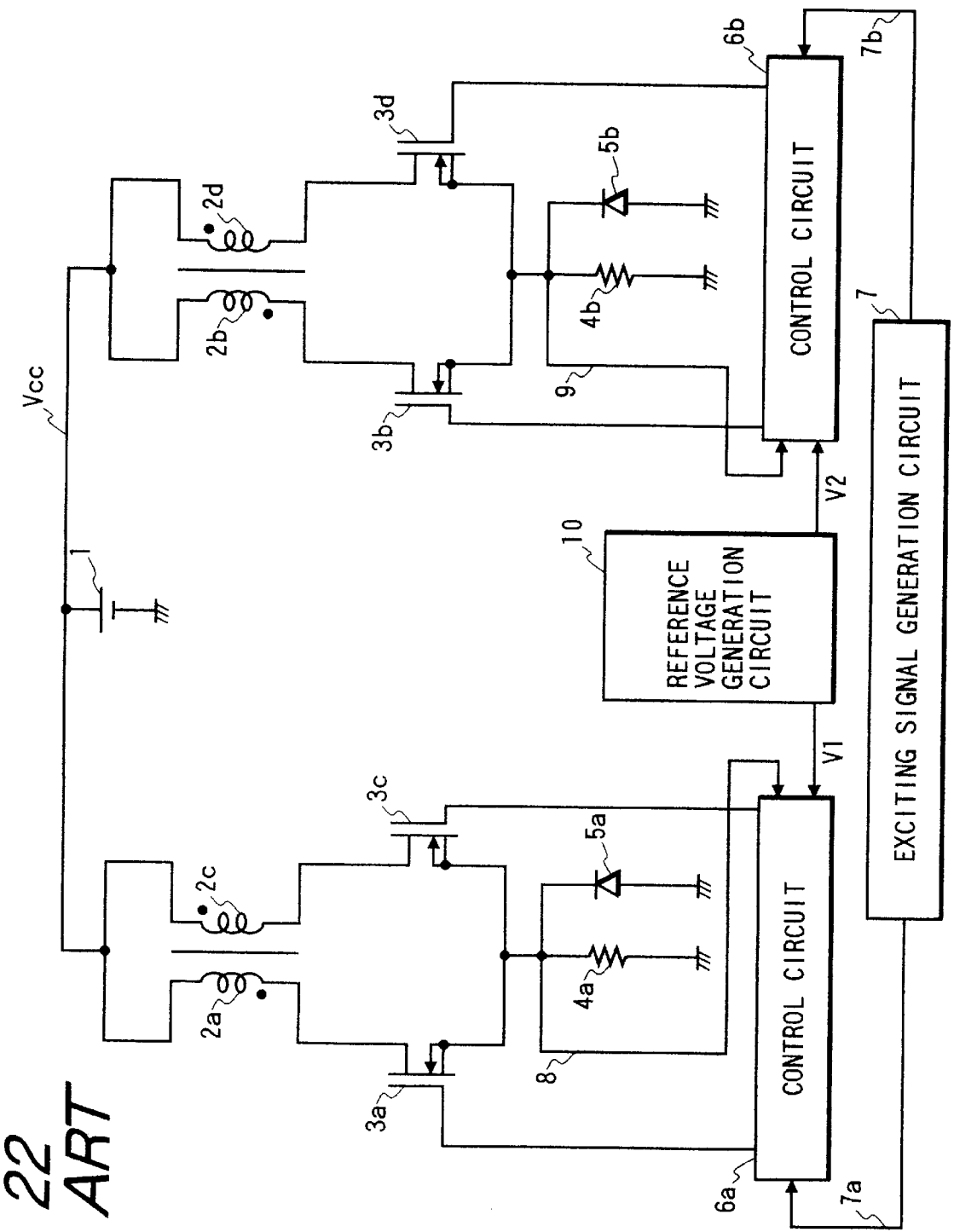
FIG. 22 is a circuit diagram showing an overall arrangement of an actuation circuit of a conventional stepping motor.
Figure 24:
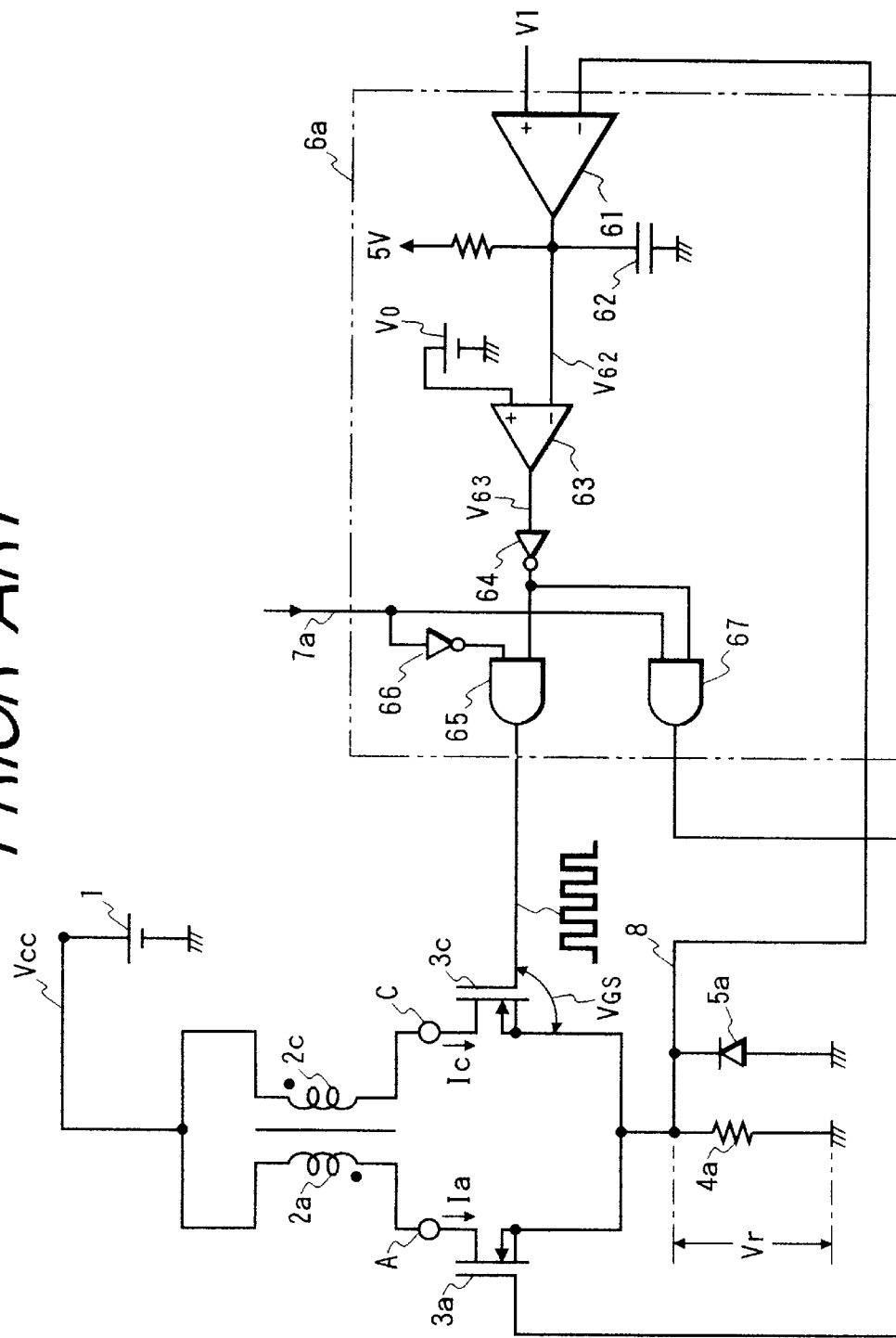
FIG. 24 is a circuit diagram showing the detailed arrangement of a control circuit shown in FIG. 22.
Figure 25:
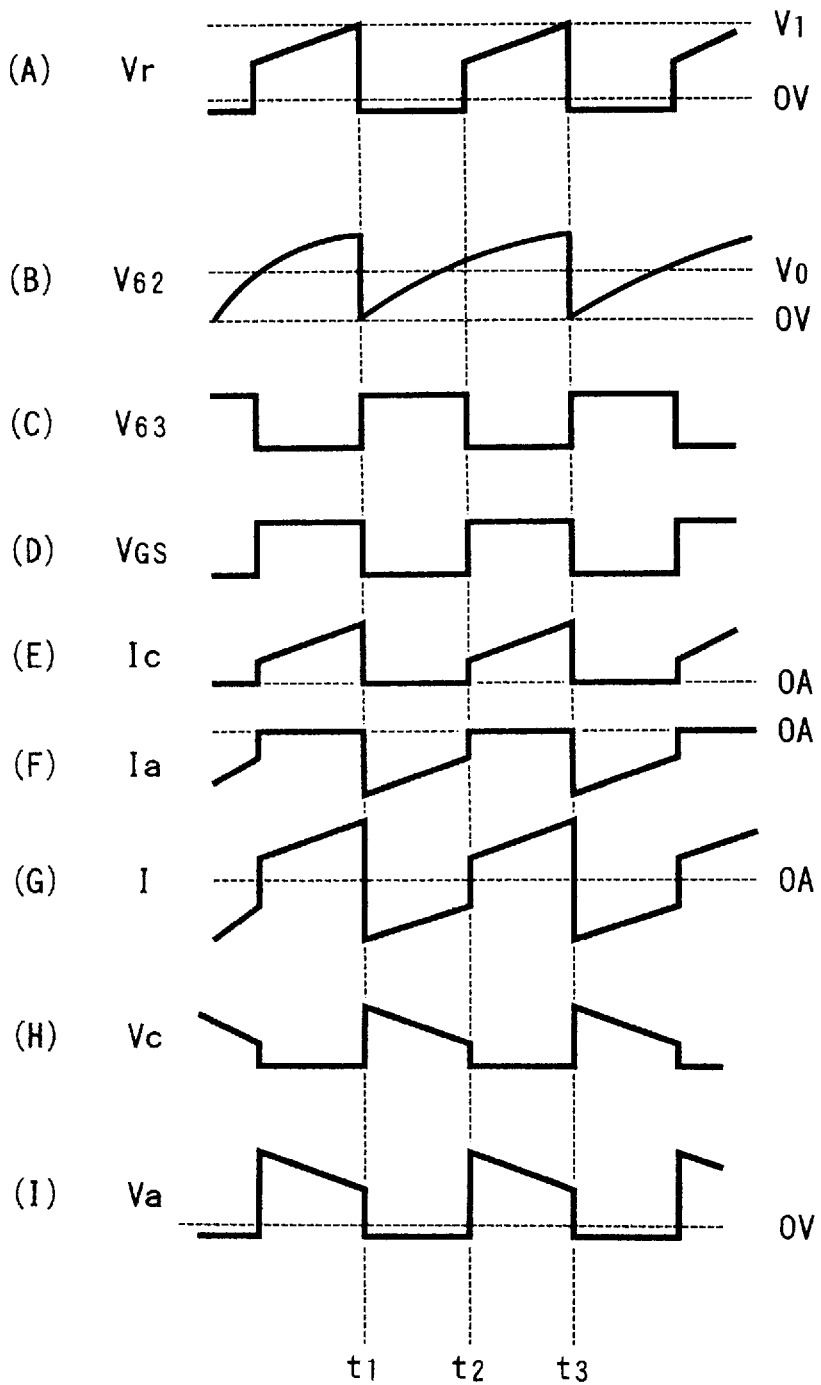
FIG. 25 is a timing chart showing signal waveforms of various portions of the actuation circuit shown in FIG. 24.

FIG. 1 shows an actuation circuit for a stepping motor in accordance with a first embodiment of the present invention. The actuation circuit of FIG. 1 corresponds to the circuit shown in FIG. 24. The arrangement not disclosed in FIG. 1 should be referred to the arrangement of FIG. 22 and 24 since they are identical with each other.

In this arrangement, reference symbol A represents a connecting point between a switching element 3a and an associated coil 2a, while reference symbol C represents a connecting point between a switching element 3c and an associated coil 2c. A pair of switching elements 11 and 12 and a pair of rectifying circuits 13 and 14 are provided between the connecting points A and C.

Figure 2:
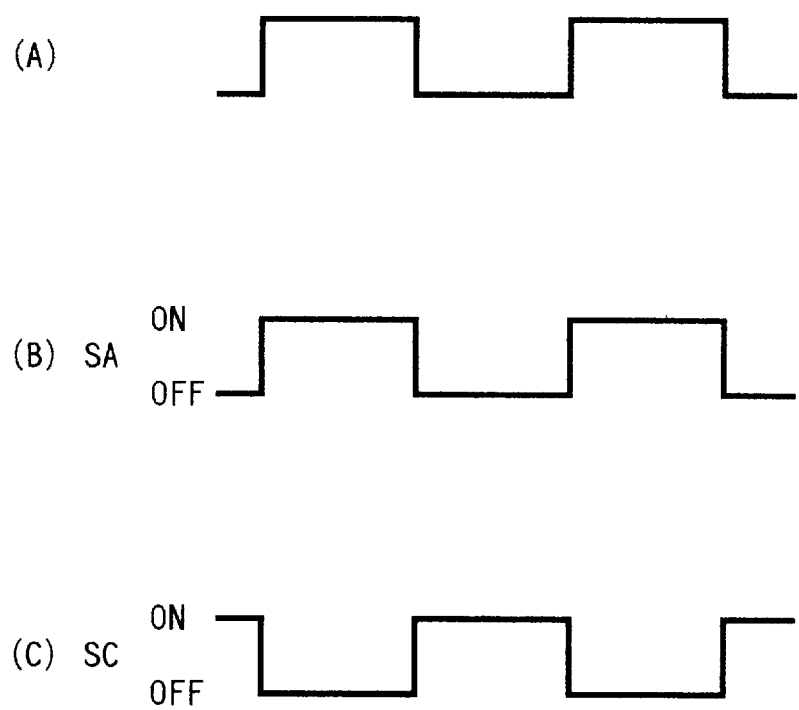
FIG. 2 is a timing chart showing turning-on operations of switching circuits 11 and 12 shown in the actuation circuit of FIG. 1.
Figure 23:
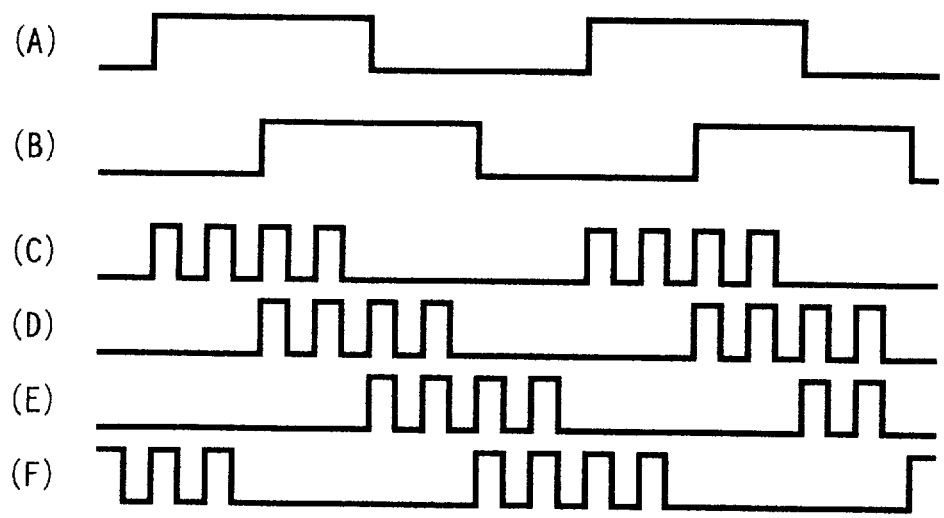
FIG. 23 is a timing chart showing the chopping control performed in the actuation circuit of FIG. 22.

Switching circuit 11 is continuously turned on during the exciting period of coil 2a. Switching circuit 12 is continuously turned on during the exciting period of coil 2c. More specifically, switching circuit 11 is activated in response to a signal SA shown by the waveform (B) of FIG. 2 in synchronism with the high-level duration of the exciting signal shown by the waveform (A) of FIG. 2 (which is identical with the waveform (A) of FIG. 23). On the other hand, switching circuit 12 is activated in response to a signal SC shown by the waveform (C) of FIG. 2 in synchronism with the low-level duration of the exciting signal.

Furthermore, rectifying circuits 13 and 14 respectively forms a one-way current path as shown by the arrow in the drawing.

Figure 3:
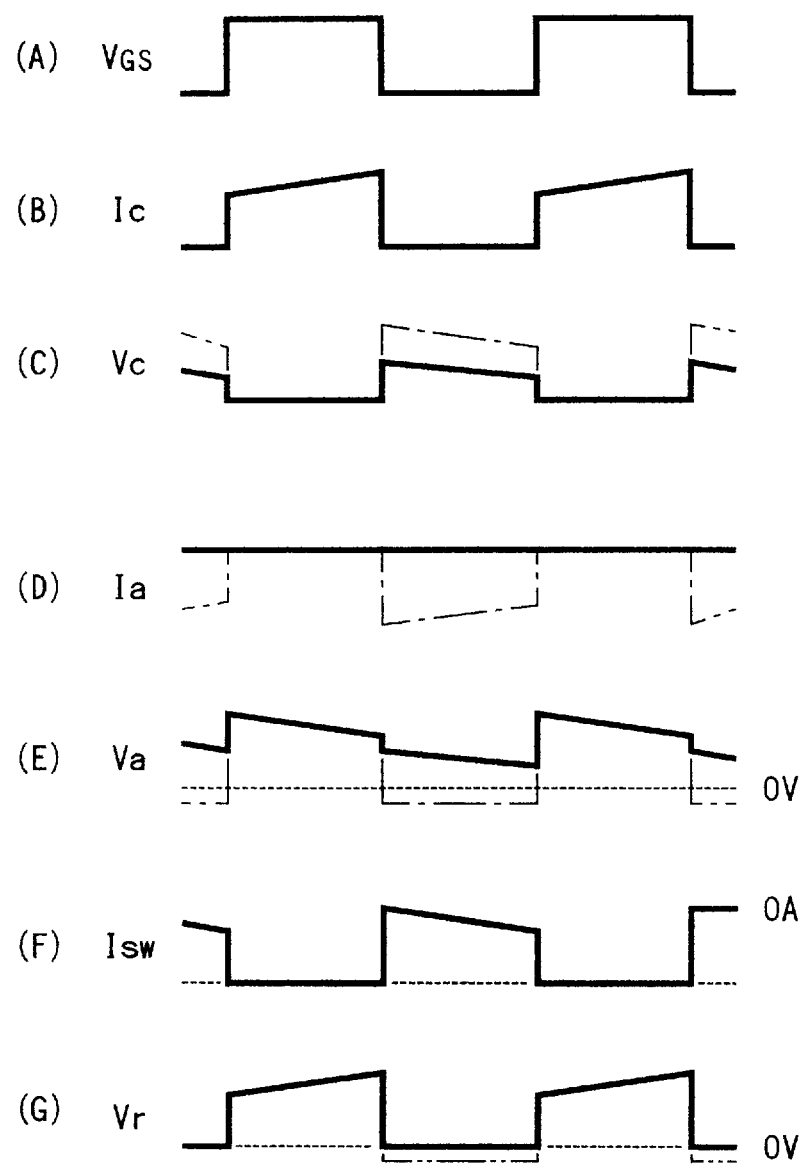
FIG. 3 is a timing chart showing waveforms of various portions of the actuation circuit shown in FIG. 1.

In the above-described arrangement, the exciting period of coil 2c will be explained with reference to the timing chart of FIG. 3. In FIG. 3, solid lines represent the waveforms of the first embodiment, while dotted lines represent the waveforms of the conventional art previously described.

In the exciting period of coil 2c, switching element 3c receives a voltage $V_{GS}$ shown by the waveform (A) of FIG. 3 and is subjected to the chopping control.

During this chopping control, current Ic (refer to the waveform (B) of FIG. 3) flows in response to the turning-on operation of switching element 3c. In this case, voltage Vc (refer to the waveform (C) of FIG. 3) of the connecting point C between switching element 3c and coil 2c is in a low-voltage level. Voltage Va (refer to the waveform (E) of FIG. 3) of the connecting point A between switching element 3a and coil 2a is increased to a high-voltage level by mutual inductance between coils 2a and 2c, in the same manner as in the conventional art.

In the exciting period of coil 2c, switching circuit 11 is in an OFF condition and switching circuit 12 is in an ON condition. In this case, current does not flow from switching circuit 12 through rectifying circuit 14 because voltage Va is higher than voltage Vc.

Subsequently, when switching element 3c is turned into an OFF condition, voltage Vc is increased by the energy stored based on excitement of coil 2c. On the contrary, in the coil 2a which is paired with coil 2c, voltage Va is decreased by the energy stored in coil 2c. In this case, upon the voltage Vc exceeding the voltage Va, current $I_{SW}$ (refer to the waveform (F) of FIG. 3) flows from switching circuit 12 through rectifying circuit 14 in accordance with the difference between Vc and Va.

According to the conventional art, when switching element 3c is turned into the OFF condition, energy stored in the coil 2c is released as the current flowing only from coil 2a. According to the present invention, switching circuit 12 and rectifying circuit 14 cooperatively constitute a current path. Hence, the energy stored in the coil 2c is converted into current and then sent from coil 2c to coil 2a through the current path thus formed. In other words, the stored energy can be released from the both ends of coils 2a and 2c.

Accordingly, as indicated by the waveform (C) of FIG. 3, the peak value of voltage Vc is reduced to approximately half of the conventional one.

When switching element 3c is turned into an ON condition, rectifying circuit 14 prevents current from flowing in the opposite direction even if voltage Va becomes higher than voltage Vc, in the same manner as in the conventional art.

Furthermore, in the exciting period of coil 2a, switching circuit 11 is in an ON condition. Hence, in response to the transition from an ON condition to the OFF condition of switching element 3a, switching circuit 11 and rectifying circuit 13 cooperatively constitute a current path to operate in the same manner as described above.

As described above, peak values of voltages Vc and Va can be largely reduced compared with the conventional ones. Hence, it becomes possible to reduce the withstand voltage of switching elements 3a and 3b. Furthermore, surge voltage can be greatly reduced. Furthermore, lowering the withstand voltage of switching elements 3a and 3c makes it possible to reduce the element area in the case these switching elements are incorporated into the semiconductor integrated circuit.

Yet further, the above-described embodiment makes it possible to eliminate diodes 5a and 5b which are conventionally required because there is no current path for supplying current to switching element 3a with inverse bias when switching elements 3a through 3d are turned off.

Figure 4:
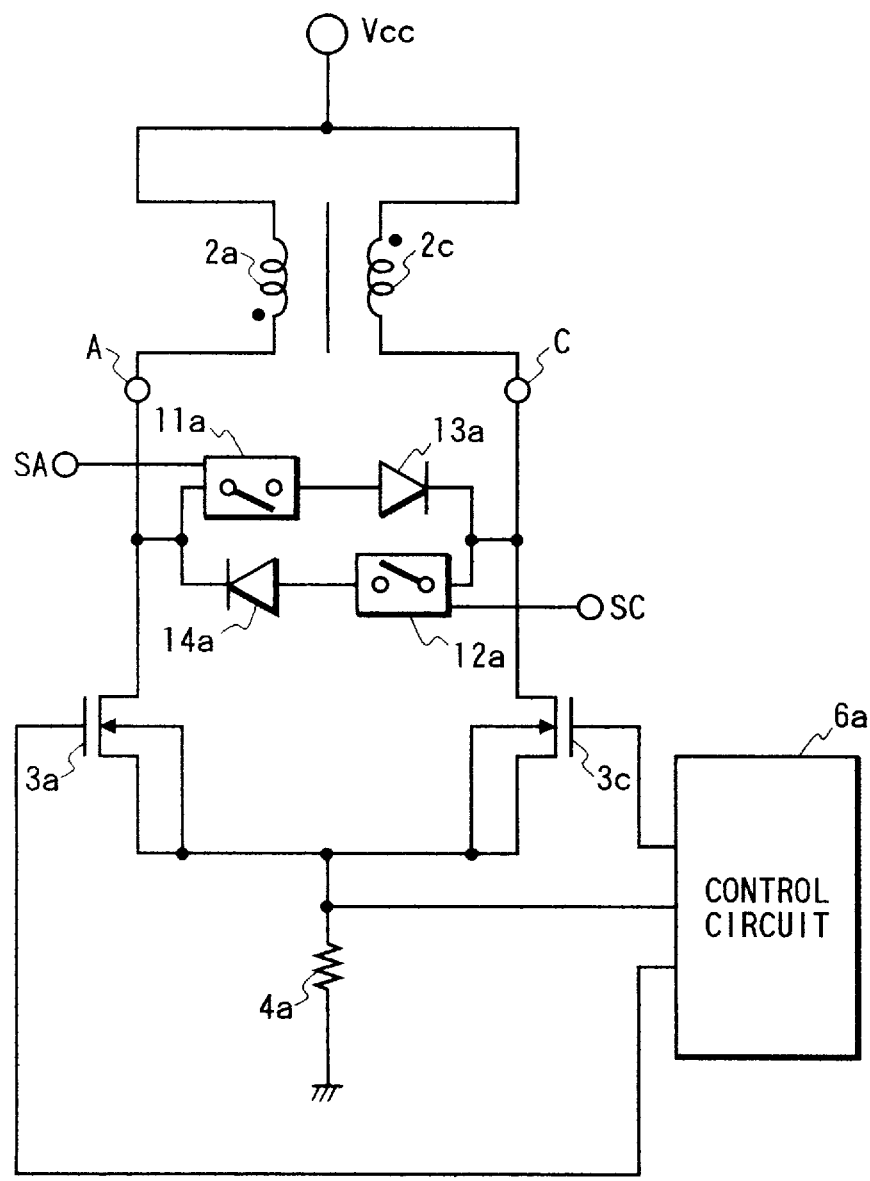
FIG. 4 is a circuit diagram showing the detailed arrangement of switching circuits 11, 12 and rectifying circuits 13, 14 shown in the actuation circuit of FIG. 1.

FIG. 4 shows the detailed arrangement of FIG. 1. Switching circuits 11 and 12 are constituted by switches 11a and 12a, while rectifying circuits 13 and 14 are constituted by diodes 13a and 14a. In this arrangement, it will be possible to connect a connecting point of switch 11a and diode 13a to a connecting point of switch 12a and diode 14a.

Embodiment 2

Figure 5:
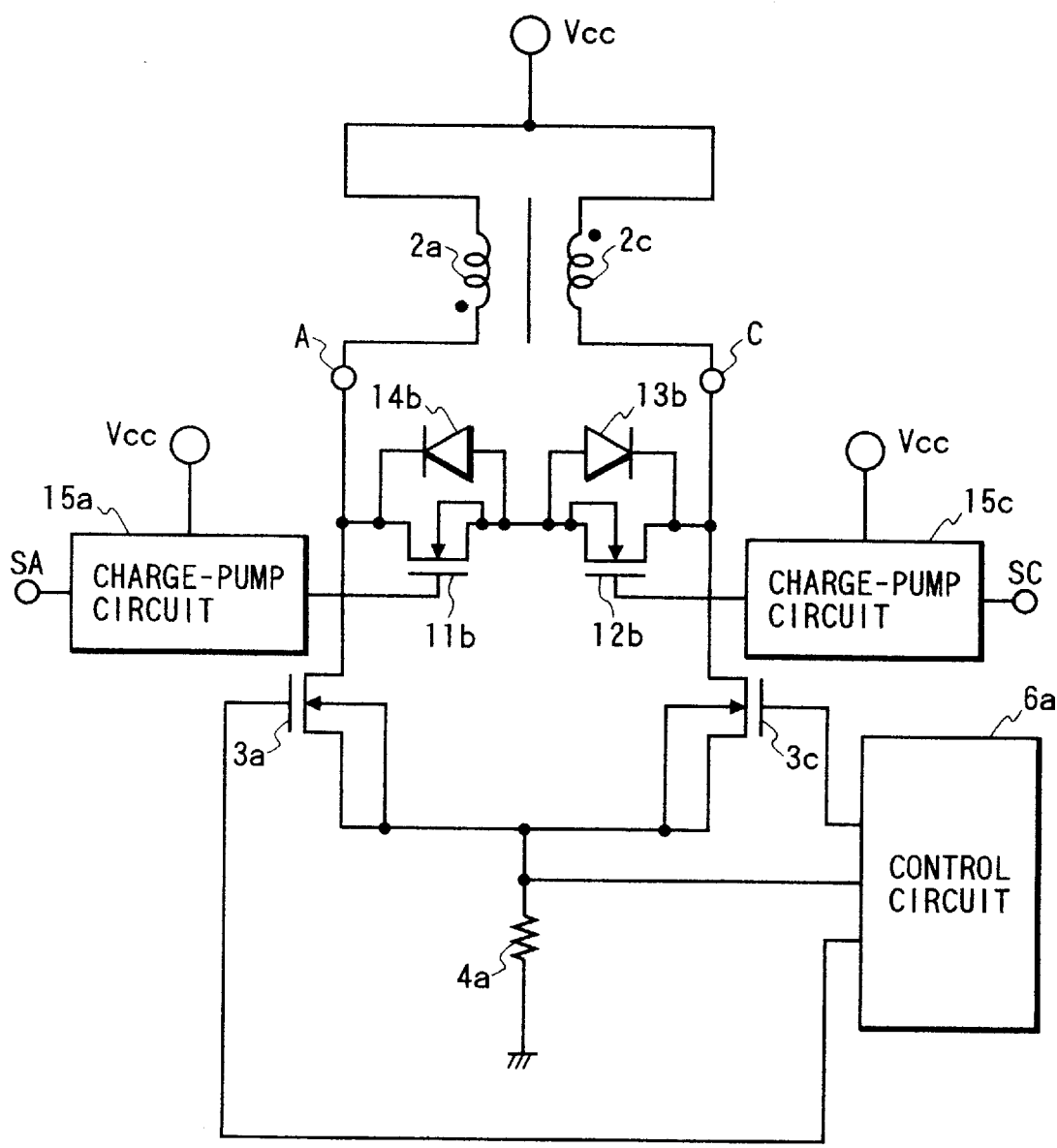
FIG. 5 is a circuit diagram showing an actuation circuit for a stepping motor in accordance with a second embodiment of the present invention, wherein switching circuits 11, 12 and rectifying circuits 13, 14 are constituted by MOS transistors 11b, 12b.

FIG. 5 shows an actuation circuit for a stepping motor in accordance with a second embodiment of the present invention. In this second embodiment, switching circuits 11, 12 and rectifying circuits 13, 14 are constituted by MOS transistors. More specifically, MOS transistors 11b and 12b act as switching circuits 11 and 12, respectively. Built-in diodes 14b and 13b of MOS transistors 11b and 12b constitute rectifying circuits 13 and 14, respectively. To operate MOS transistors 11b and 12b, there are provided charge-pump circuits 15a and 15c for increasing the voltage Vcc to a predetermined gate-voltage level.

In this embodiment, during the exciting period of coil 2c, signal SC is in HIGH level and signal SA is in LOW level. In other words, charge-pump circuit 15c is in an activated condition while charge-pump circuit 15a is in a deactivated condition. Hence, MOS transistor 12b is turned on but MOS transistor 11b is turned off. On the other hand, during the exciting period of coil 2a, MOS transistor 12b is turned off but MOS transistor 11b is turned on.

Therefore, by the ON-OFF operation of MOS transistors 11b and 12b and the operation of their built-in diodes 14b and 13b, the actuation circuit of this second embodiment can operate in the same manner as the actuation circuit of the first embodiment.

In this arrangement, it is possible to eliminate one of charge-pump circuits 15a and 15c, instead the remaining charge-pump circuit is used to switch the gate voltage applied to both of MOS transistors 11b and 12b in response to signals SA and SC.

Figure 6:
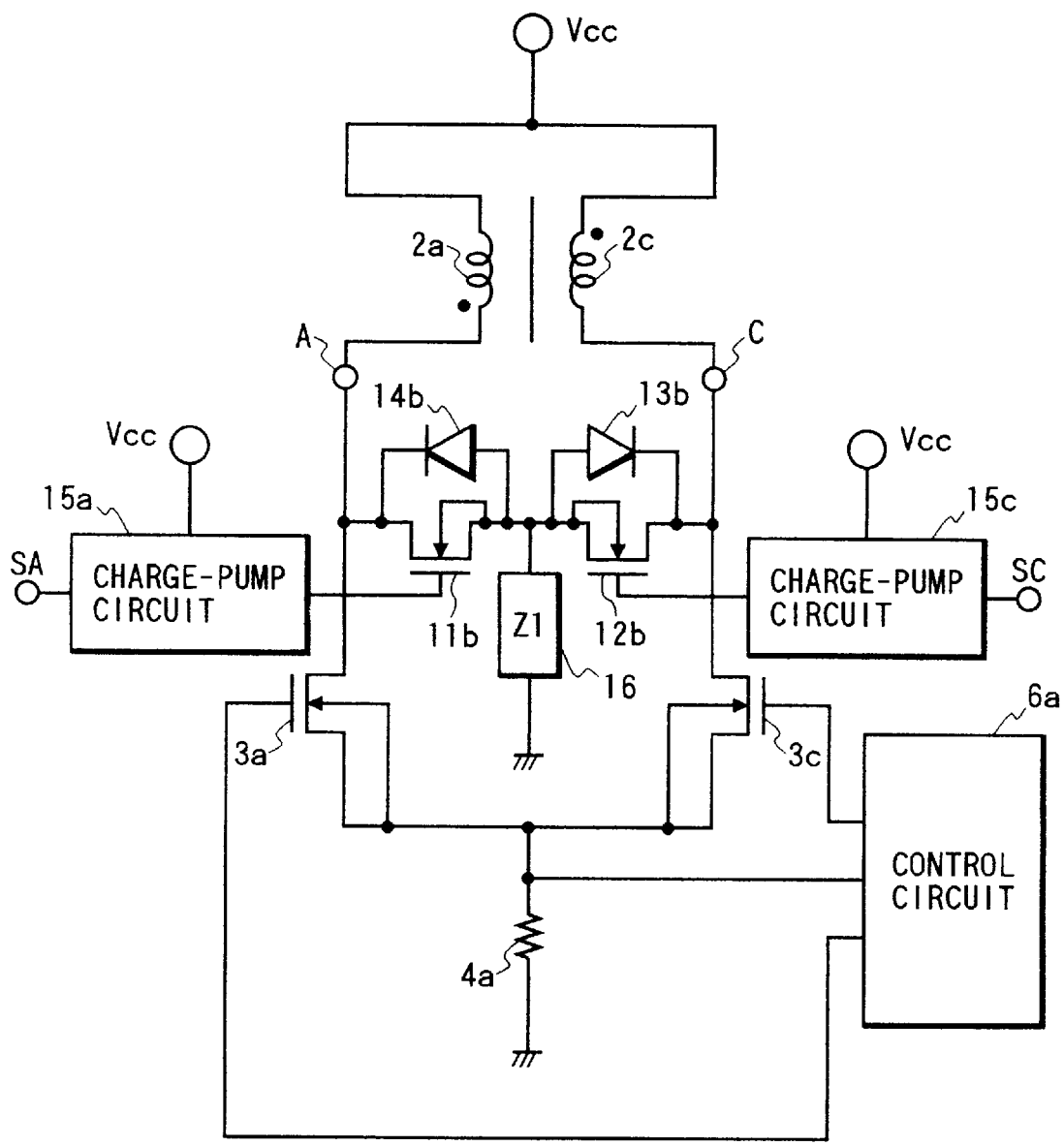
FIG. 6 is a circuit diagram showing an actuation circuit for a stepping motor similar to the arrangement of FIG. 5 but different in that the electrical potential of a midpoint between MOS transistors 11b and 12b is fixed.

FIG. 6 is a modified embodiment of the actuation circuit shown in FIG. 5. This embodiment is characterized in that the midpoint between MOS transistors 11b and 12b is grounded through a predetermined potential fixing circuit 16 without leaving it in a floating condition. This arrangement is advantageous to let any noise, if induced by the operation of the motor, go to the ground through potential fixing circuit 16. Thus, it becomes possible to reduce erroneous operations or malfunction due to such noises. Preferably, the potential fixing circuit 16 may comprise an impedance element having a predetermined impedance Z1 or a constant-current circuit etc.

Embodiment 3

Figure 7:
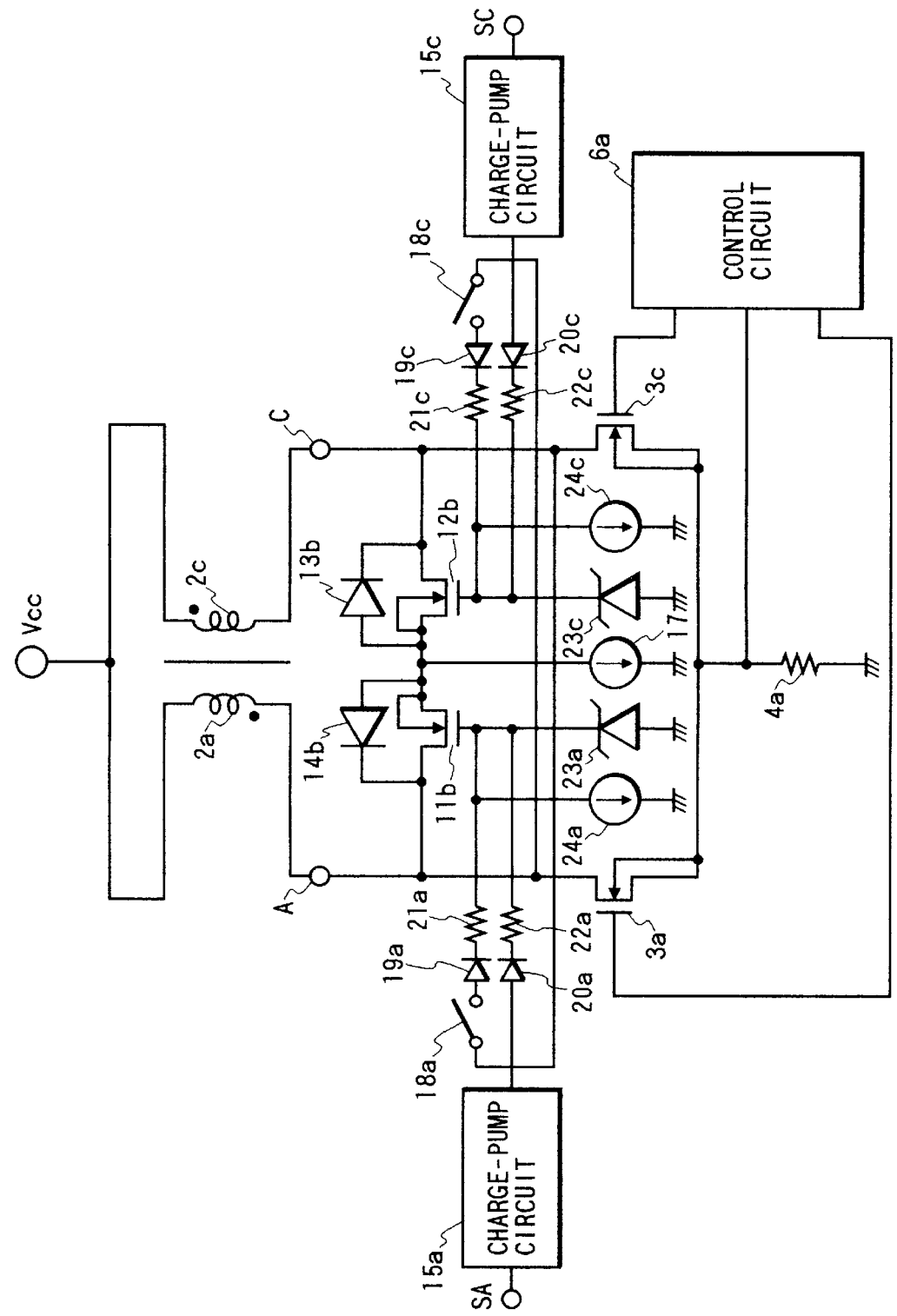
FIG. 7 is a circuit diagram showing an actuation circuit for a stepping motor in accordance with a third embodiment of the present invention.

FIG. 7 shows an actuation circuit for a stepping motor in accordance with a third embodiment of the present invention. In FIG. 7, there is provided a constant-current circuit 17 for fixing the electrical potential of the midpoint between MOS transistors 11b and 12b.

To operate MOS transistors 11b and 12b, it is definitely necessary to provide the above-described charge-pump circuits 15a and 15c. However, there is the possibility that a sufficient amount of gate voltage cannot be supplied due to fluctuation of voltage Vcc or the like.

Hence, the third embodiment applies the gate-source voltage to one of MOS transistors 11b and 12b when it is activated, by utilizing the voltage of the coil being in a non-excited period.

More specifically, in the exciting period of coil 2c, the gate of MOS transistor 12b is charged through a switching element 18c by using the voltage Va of the connecting point A of coil 2a. That is, the voltage Va of the connecting point A is in the high-voltage level during the ON period of switching element 3c. This voltage is utilized to charge the gate of MOS transistor 12b. Through this charging operation, the gate-source voltage of MOS transistor 12b can exceed the threshold voltage. Thus, MOS transistor 12b can be turned on.

Similarly, in the exciting period of coil 2a, the gate of MOS transistor 11b is charged through a switching element 18a by using the voltage Vc of the connecting point C of coil 2c.

According to the circuit arrangement of FIG. 7, charge-pump circuits 15a and 15c have a function of supplying the gate voltage. To utilize this ability, diodes 19a, 19c, 20a, 20c and resistances 21a, 21c, 22a, 22c are associated with charge-pump circuits 15a and 15c as shown in the drawing.

The above-described gate voltage supply arrangement serves as a means for performing the initial charge operation for the gate of the MOS transistor not operated when the exciting period is switched, and also as a countermeasure for assuring a sufficient gate-source voltage in case of the lack of voltage given by the coil being in the non-excited period.

If the circuit is designed to have an effective mechanism capable of preventing such a problem, it will be possible to eliminate the gate voltage supply arrangement constituted by the charge-pump circuits 15a and 15c. In this case, no external power source unit will be necessary.

Zener diodes 23a and 23c are provided to clamp the gate voltage at a predetermined voltage.

Furthermore, the voltage charged at the gate of the MOS transistor continuously maintains the ON condition of the MOS transistor. Hence, there is the necessity of providing a discharge circuit which discharges the voltage of the gate upon termination of the exciting period. To this end, this embodiment provides constant-current circuits 24a and 24c serving as this kind of discharge circuit.

Figure 8:
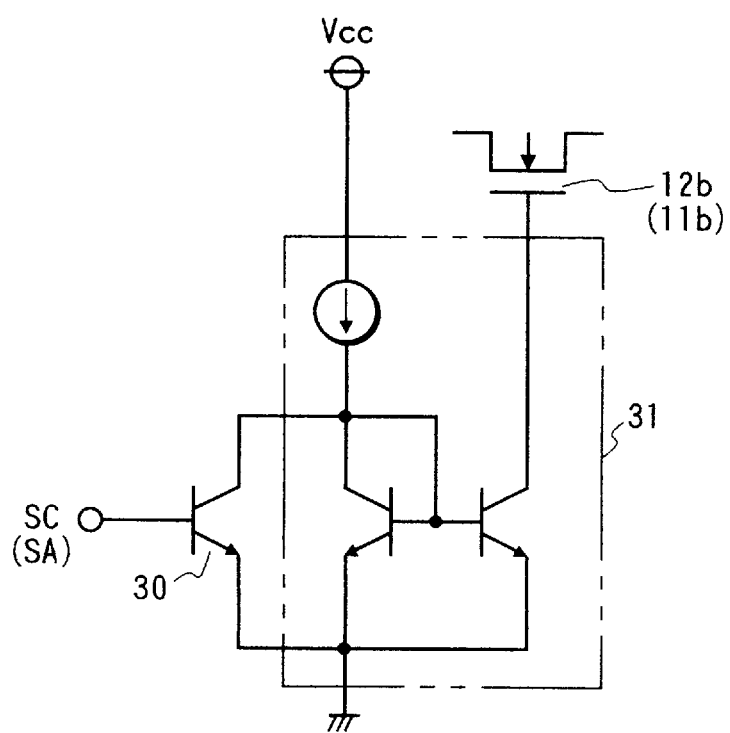
FIG. 8 is a circuit diagram showing the detailed arrangement of constant-current circuits 24a and 24c shown in FIG. 7.

FIG. 8 shows a detailed arrangement of constant-current circuit 24c. Constant-current circuit 24c comprises a transistor 30 being turned on and off in response to the signal SC which becomes HIGH level during the exciting period of coil 2c, and a current mirror circuit 31 producing a constant current during the turned-off period of transistor 30. In the exciting period of coil 2c, transistor 30 is turned on in response to the signal SC of HIGH level, allowing the charging operation of the gate of MOS transistor 12b. On the other hand, in the non-excited period of coil 2c, transistor 30 is turned off in response to the signal SC of LOW level, causing the current mirror circuit 31 to ground the gate of MOS transistor 12b.

By using such a constant-current circuit 24c, it becomes possible to prevent the gate voltage of MOS transistor 12b from suddenly dropping, thus suppressing any surge voltage causing at the connecting point C when the MOS transistor 12b is turned off.

The other constant-current circuit 24a has the same arrangement as that of constant-current circuit 24c. As shown in FIG. 8, the gate of MOS transistor 11b is charged or discharged in response to the signal SA becoming HIGH level during the exciting period of coil 2a.

Figure 9:
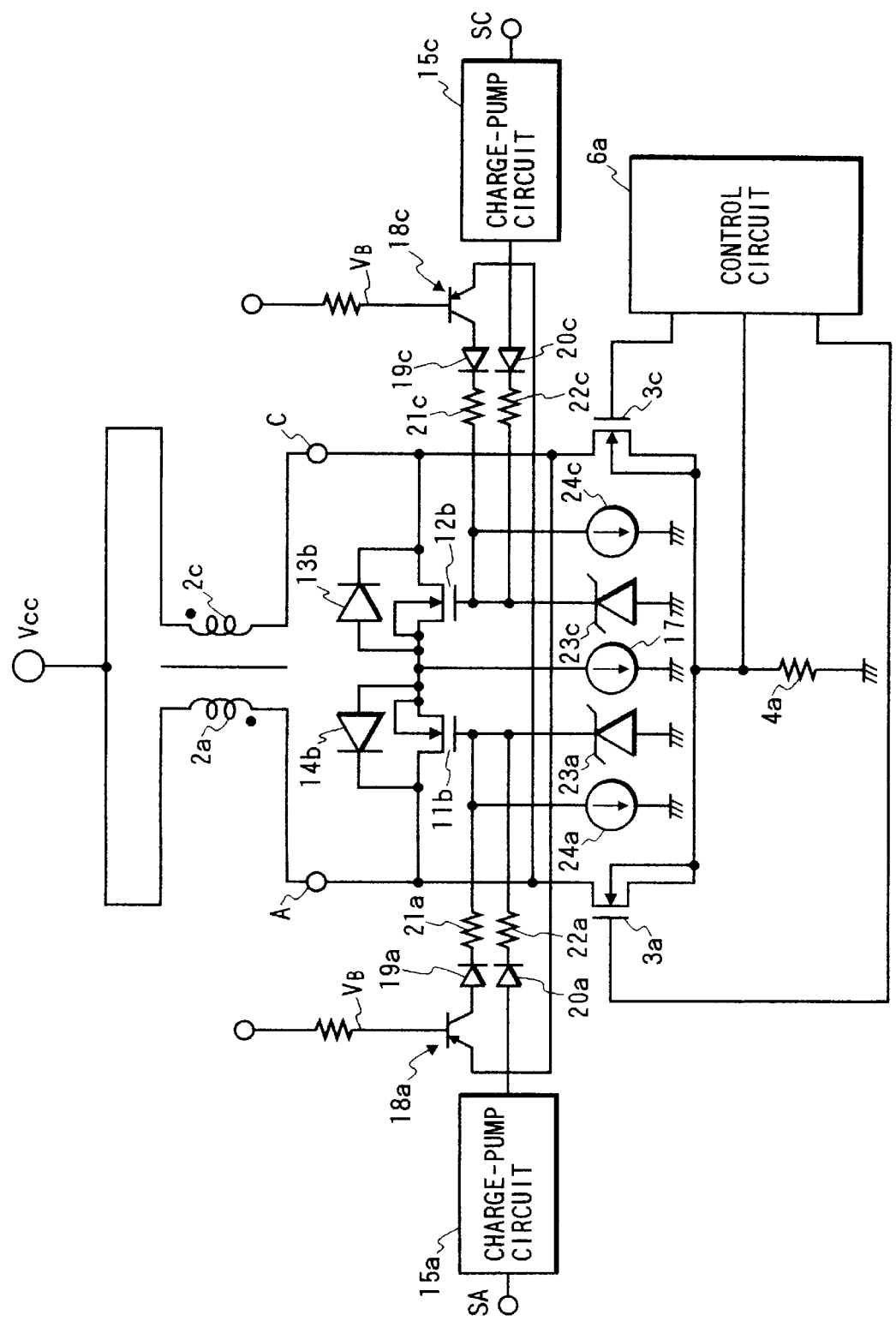
FIG. 9 is a circuit diagram showing the detailed arrangement of the actuation circuit shown in FIG. 7.
Figure 10:
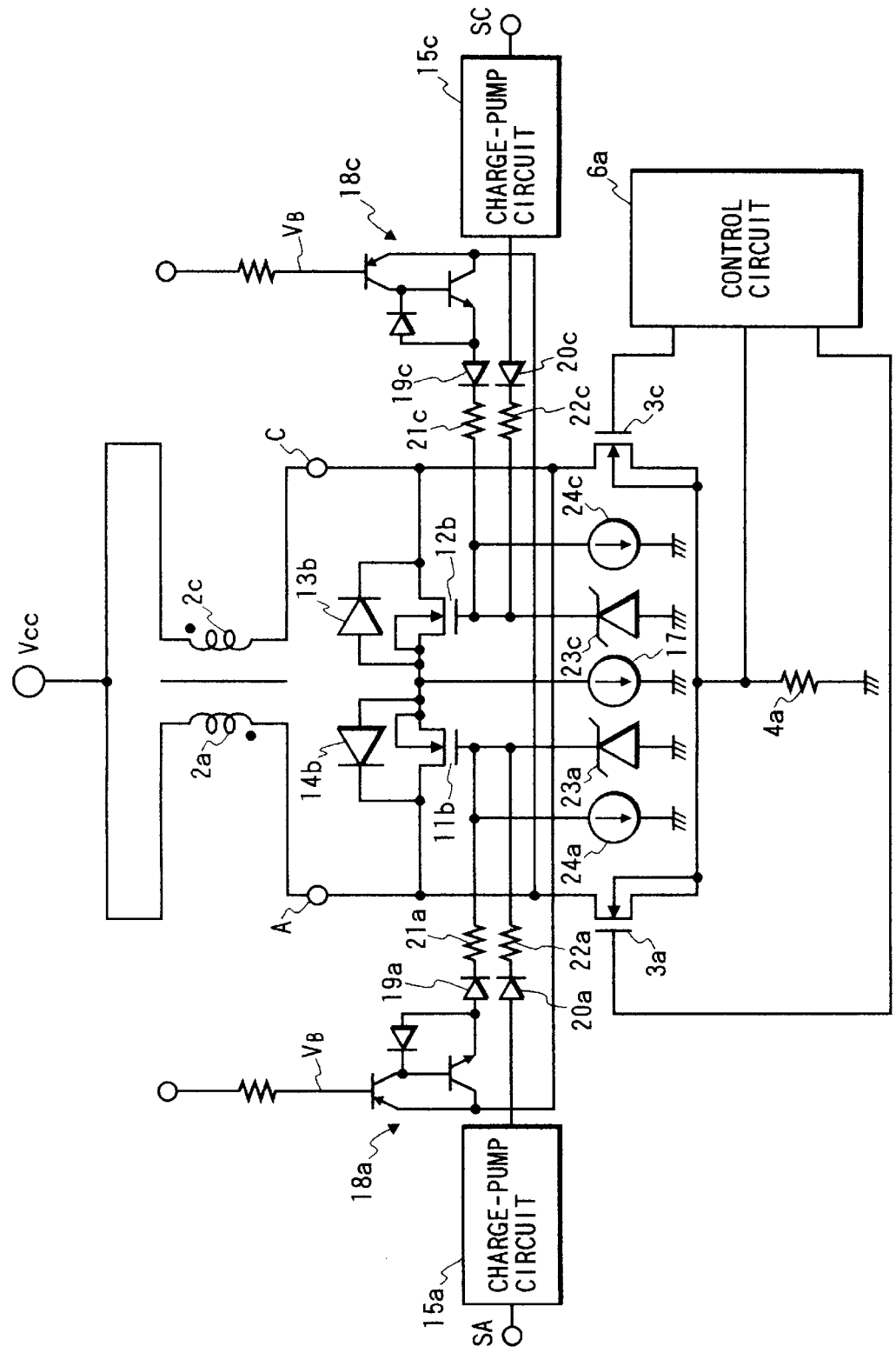
FIG. 10 is a circuit diagram showing a modified arrangement of the actuation circuit shown in FIG. 7.

FIG. 9 shows the more detailed arrangement of FIG. 7, wherein switching elements 18a and 18c are constituted by transistors. In this arrangement, when the coil being in the non-excited period reaches a high-voltage level, its voltage is applied to the emitter of transistor 18a (or 18c). Accordingly, this transistor is turned on in the relationship to the base voltage $V_B$, and charges the gate of MOS transistor automatically. Transistors 18a and 18c can be constituted by the Darlington connection shown in FIG. 10.

Embodiment 4

Figure 11:
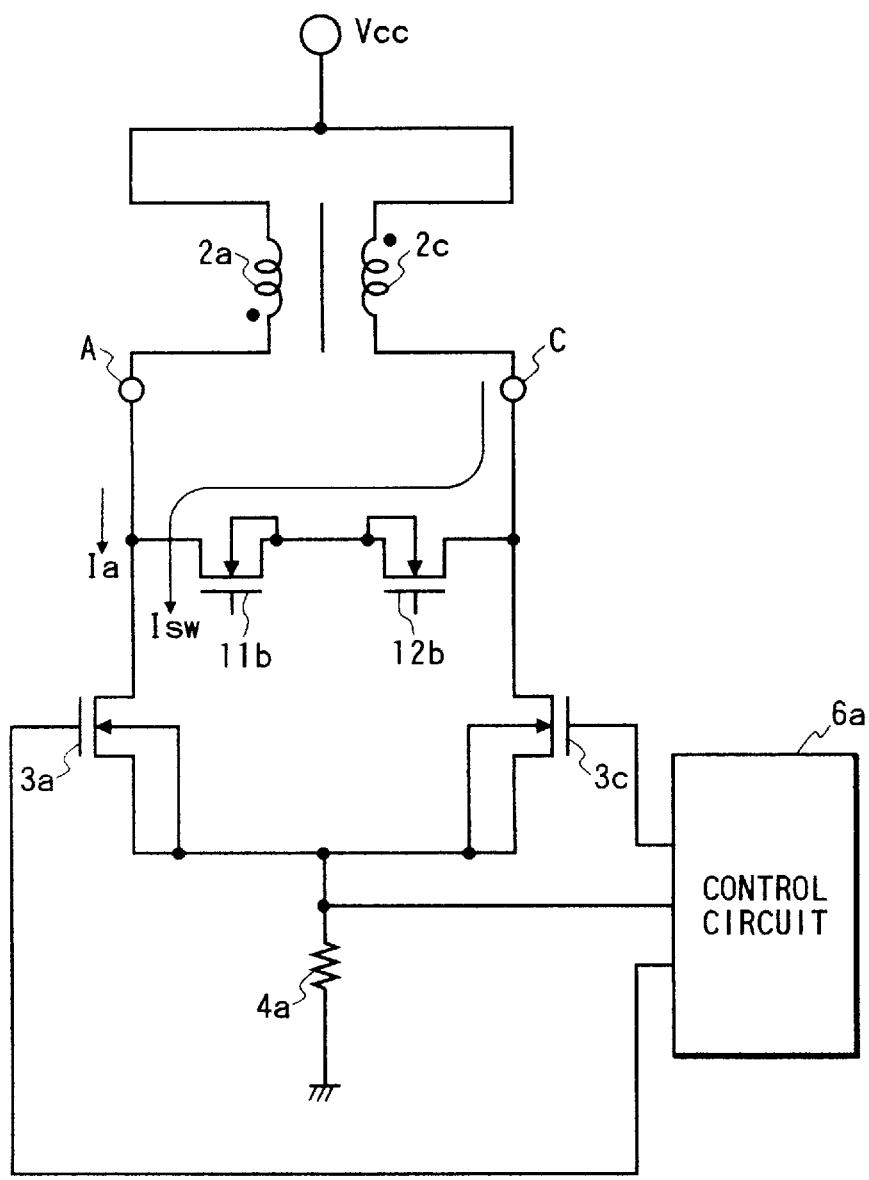
FIG. 11 is a circuit diagram showing a problem caused in the second and third embodiments.

In the above-described second and third embodiments, the behavior during the switching operation of the coil current is not explained. In this current switching operation, transistor 3a is turned on at the time the exciting period of coil 2c is switched to the exciting period of coil 2a. In this moment, in addition to the current Ia flowing from coil 2a, loop current $I_{SW}$ circulating MOS transistors 11b and 12b flows through transistor 3a, as shown in FIG. 11. As a result, consumption power is enlarged, and the motor actuation efficiency is lowered.

Figure 12:
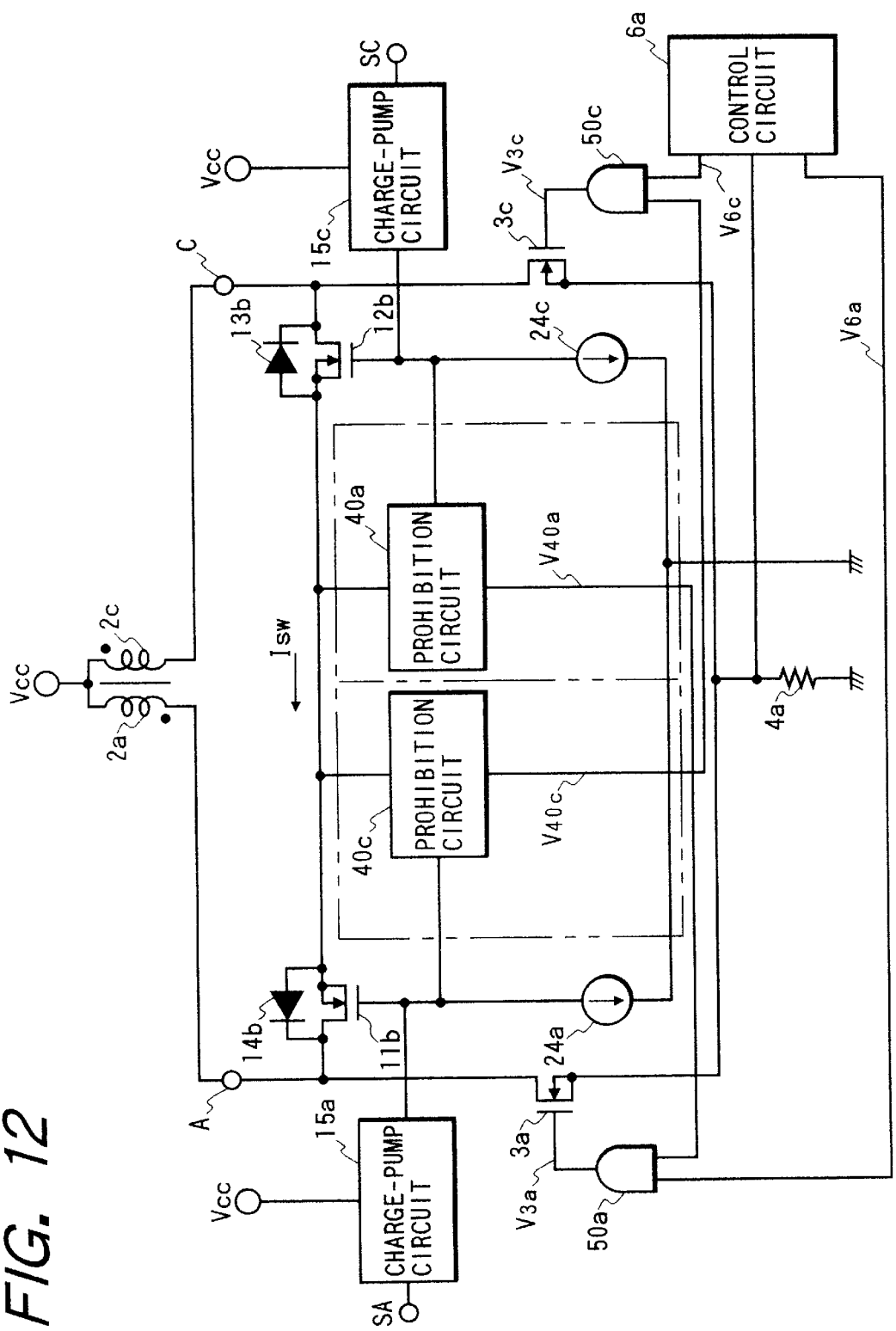
FIG. 12 is a circuit diagram showing an actuation circuit for a stepping motor in accordance with a fourth embodiment of the present invention.

In view of this problem, as shown in FIG. 12, the fourth embodiment provides prohibition circuits 40a and 40c to prohibit the switching operation of the coil current until the above-described loop current $I_{SW}$ is reduced to a predetermined value at the time the coil current is switched, more specifically until the gate-source voltage of MOS transistors 11b and 12b is reduced to a value near the threshold voltage.

For example, when the exciting period of coil 2c is switched to the exciting period of coil 2a, the gate voltage of MOS transistor 12b is reduced due to the discharge operation of discharge circuit 24c. Prohibition circuit 40a monitors the gate-source voltage of MOS transistor 12b and continuously sends a LOW-level signal to AND circuit 50a until the gate-source voltage of MOS transistor 12b is reduced to a value near the threshold voltage, thereby continuously turning off the transistor 3a. With this operation, it becomes possible to prevent the loop current $I_{SW}$ from flowing through transistor 3a at the moment the coil current is switched to coil 2a.

In the same manner, when the exciting period of coil 2a is switched to the exciting period of coil 2c, prohibition circuit 40c monitors the gate-source voltage of MOS transistor 11b and continuously sends a LOW-level signal to AND circuit 50c until the gate-source voltage of MOS transistor 11b is reduced to a value near the threshold voltage, thereby continuously turning off the transistor 3c. With this operation, it becomes possible to prevent the loop current $I_{SW}$ from flowing through transistor 3c at the moment the coil current is switched to coil 2c.

Figure 13:
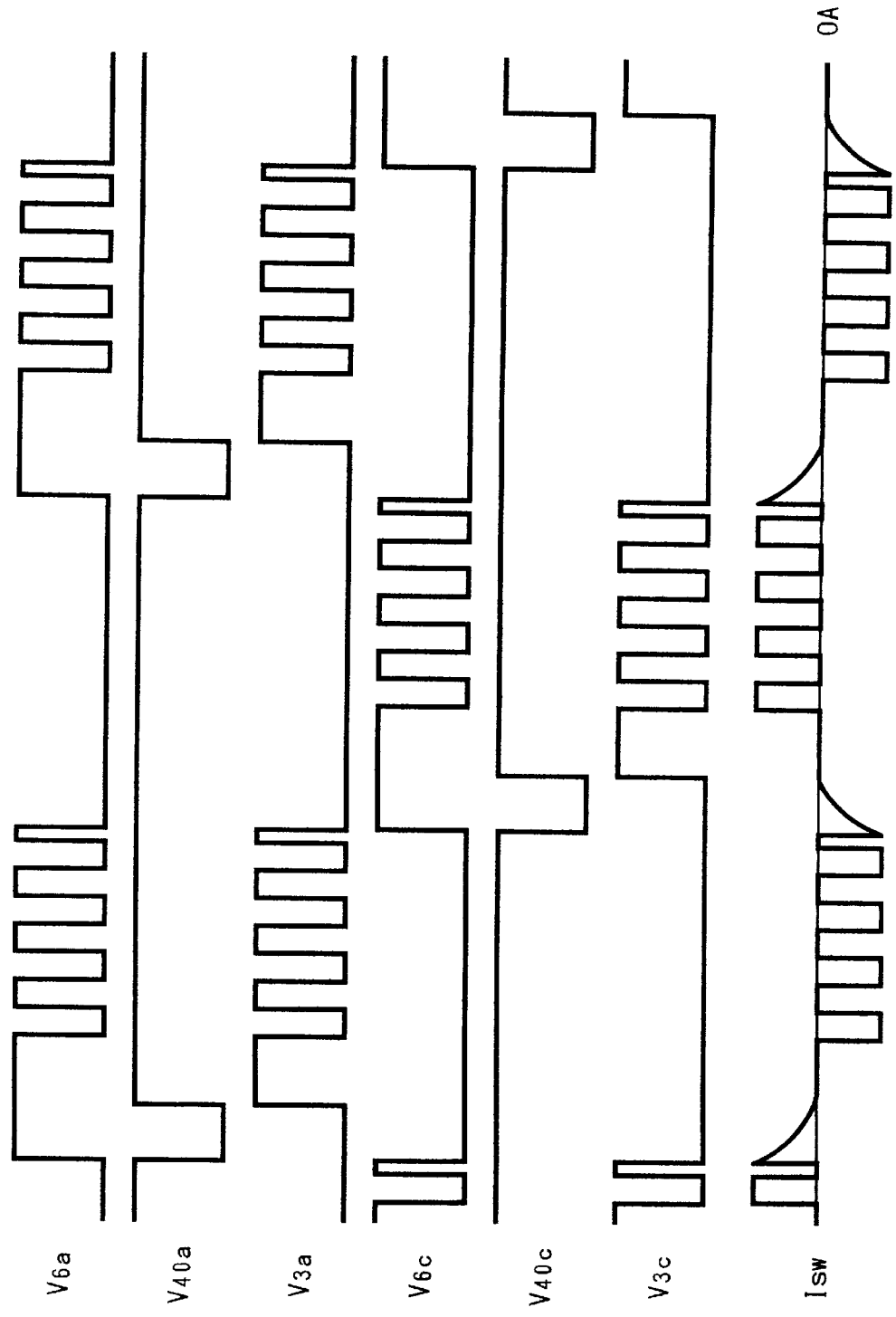
FIG. 13 is a view showing signal waveforms at various portions of the actuation circuit shown in FIG. 12.

FIG. 13 shows signal waveforms at various portions of the actuation circuit shown in FIG. 12. $V_{6a}$ represents the waveform of a chopper control signal for transistor 3a produced from control circuit 6a. $V_{40a}$ represents the waveform of an output signal produced from the prohibition circuit 40a. $V_{3a}$ represents the waveform of an output signal produced from the AND circuit 50a. $V_{6c}$ represents the waveform of a chopper control signal of transistor 3c produced from control circuit 6a. $V_{40c}$ represents the waveform of an output signal produced from the prohibition circuit 40c. $V_{3c}$ represents the waveform of an output signal produced from the AND circuit 50c. $I_{SW}$ represents the waveform of the above-described loop current.

FIG. 12 is based on the arrangement of FIG. 7, although the components 18a, 18c through 23a, 23c are not disclosed. The arrangement of FIG. 12 can be applied to FIG. 9 or FIG. 10.

Next, the detailed arrangement of prohibition circuits 40a and 40c will be explained.

Figure 14:
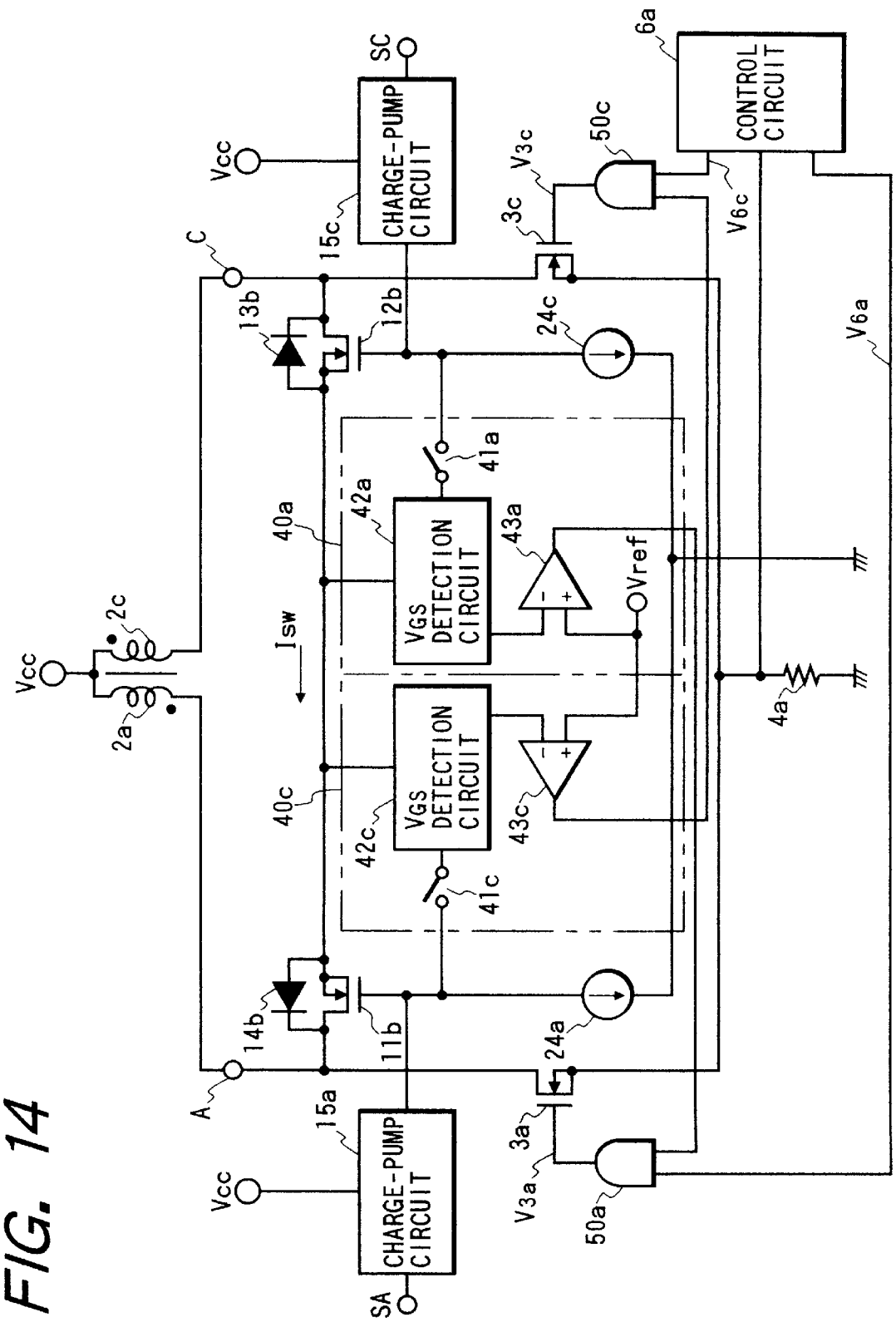
FIG. 14 is a circuit diagram showing the detailed arrangement of the actuation circuit shown in FIG. 12.

FIG. 14 shows the prohibition circuits 40a and 40c in more detail. Prohibition circuit 40a comprises a switching element 41a which turns on in response to the signal SA becoming HIGH level when the exciting period of coil 2a is started, $V_{GS}$ detection circuit 42a which detects the gate-source voltage of MOS transistor 12b, and a comparator 43a which compares the output voltage of $V_{GS}$ detection circuit 42a with the reference voltage $V_{ref}$ and produces a LOW-level signal when the gate-source voltage of MOS transistor 12b exceeds the threshold voltage.

Signal SA becomes HIGH level at the time the exciting period of coil 2c is switched to the exciting period of coil 2a. Hence, switching element 41a is turned on, and $V_{GS}$ detection circuit 42a detects the gate-source voltage of MOS transistor 12b. Comparator 43a continuously generates a LOW-level signal during the duration the gate-source voltage of MOS transistor 12b exceeds the threshold voltage. This LOW-level signal is entered into the AND circuit 50a to turn off transistor 3a.

With the above-described arrangement, it becomes possible to prevent transistor 3a from being turned on immediately after the exciting period of coil 2a is started. Then, once the gate-source voltage of MOS transistor 12b is reduced to a value near the threshold voltage, comparator 43a produces a HIGH-level signal. In response to this HIGH-level signal, transistor 3a is turned on ordinarily.

Similarly, prohibition circuit 40c comprises a switching element 41c, a $V_{GS}$ detection circuit 42c, and a comparator 43c. With these components, prohibition circuit 40c prohibits the turning-on operation of transistor 3c immediately after the exciting period of coil 2c is started.

Figure 15:
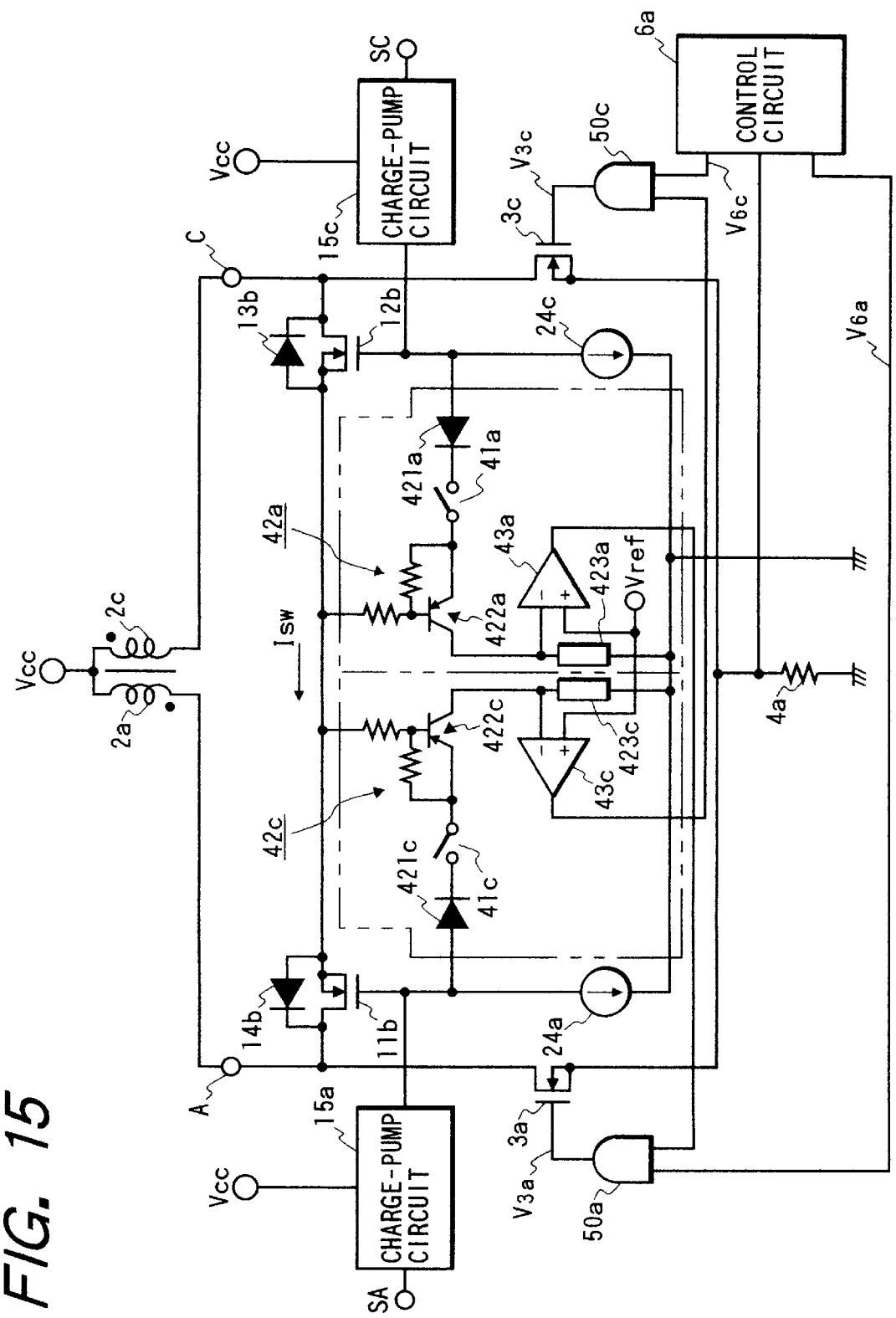
FIG. 15 is a circuit diagram showing the further detailed arrangement of the actuation circuit shown in FIG. 14.

FIG. 15 shows the further detailed arrangement of prohibition circuits 40a and 40c.

$V_{GS}$ detection circuit 42a comprises a diode 421a, a transistor circuit 422a which is activated in response to the turning-on operation of switching element 41a, and an impedance element 423a which generates a voltage in accordance with the current flowing through transistor circuit 422a. When switch 41a is closed in response to signal SA of HIGH level, transistor circuit 422a is turned on as long as the gate-source voltage of MOS transistor 12b exceeds the threshold voltage. Accordingly, the terminal voltage of impedance element 423a exceeds the reference voltage $V_{ref}$, and, comparator 43a produces a LOW-level signal.

$V_{GS}$ detection circuit 42c of prohibition circuit 40c of MOS transistor 12b has the same arrangement and function as the above-described $V_{GS}$ detection circuit 42a.

Figure 16:
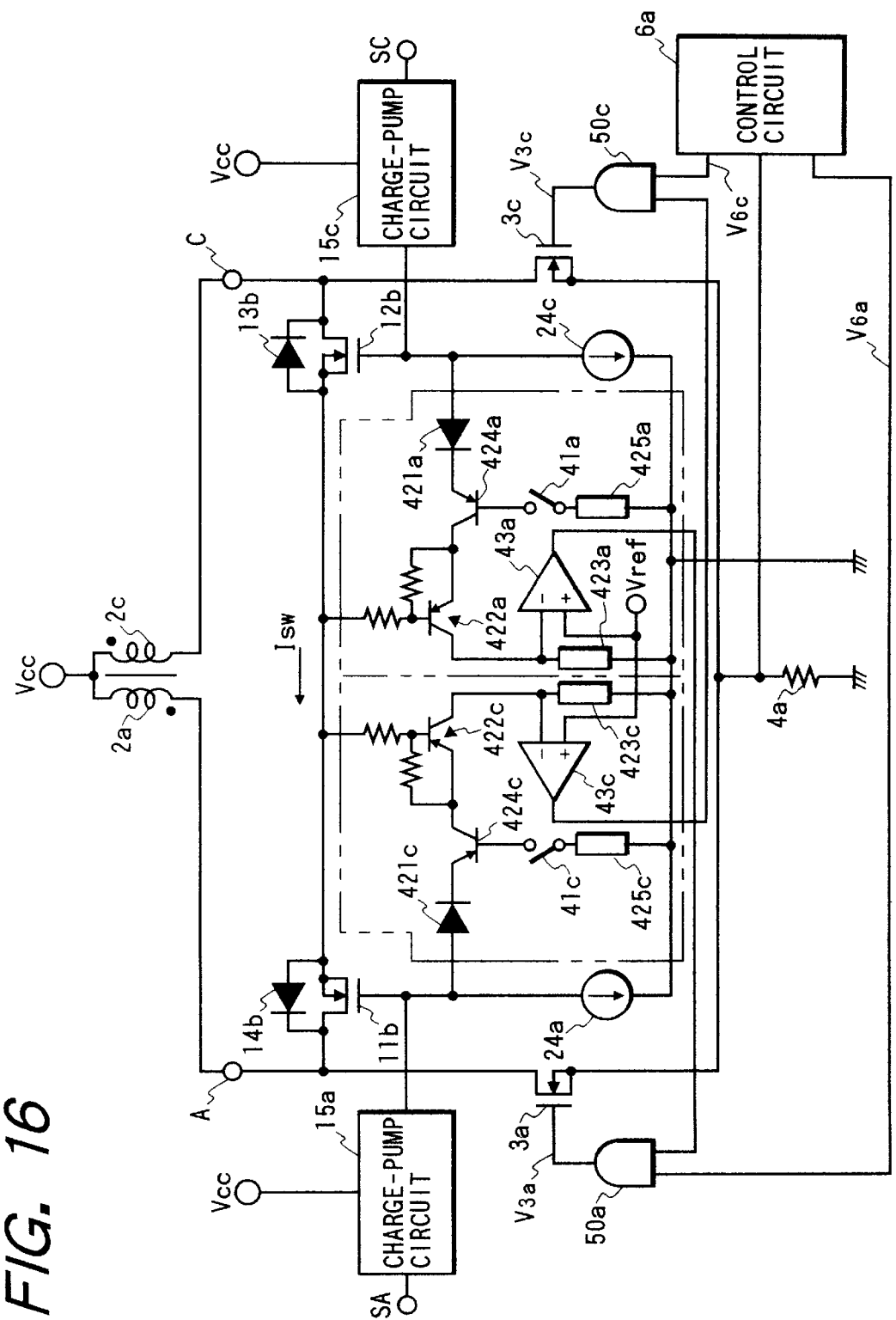
FIG. 16 is a circuit diagram showing another detailed arrangement of the actuation circuit shown in FIG. 14.

Furthermore, it is possible to add transistors 424a, 424c and impedance elements 425a, 425c as shown in FIG. 16.

Figure 17:
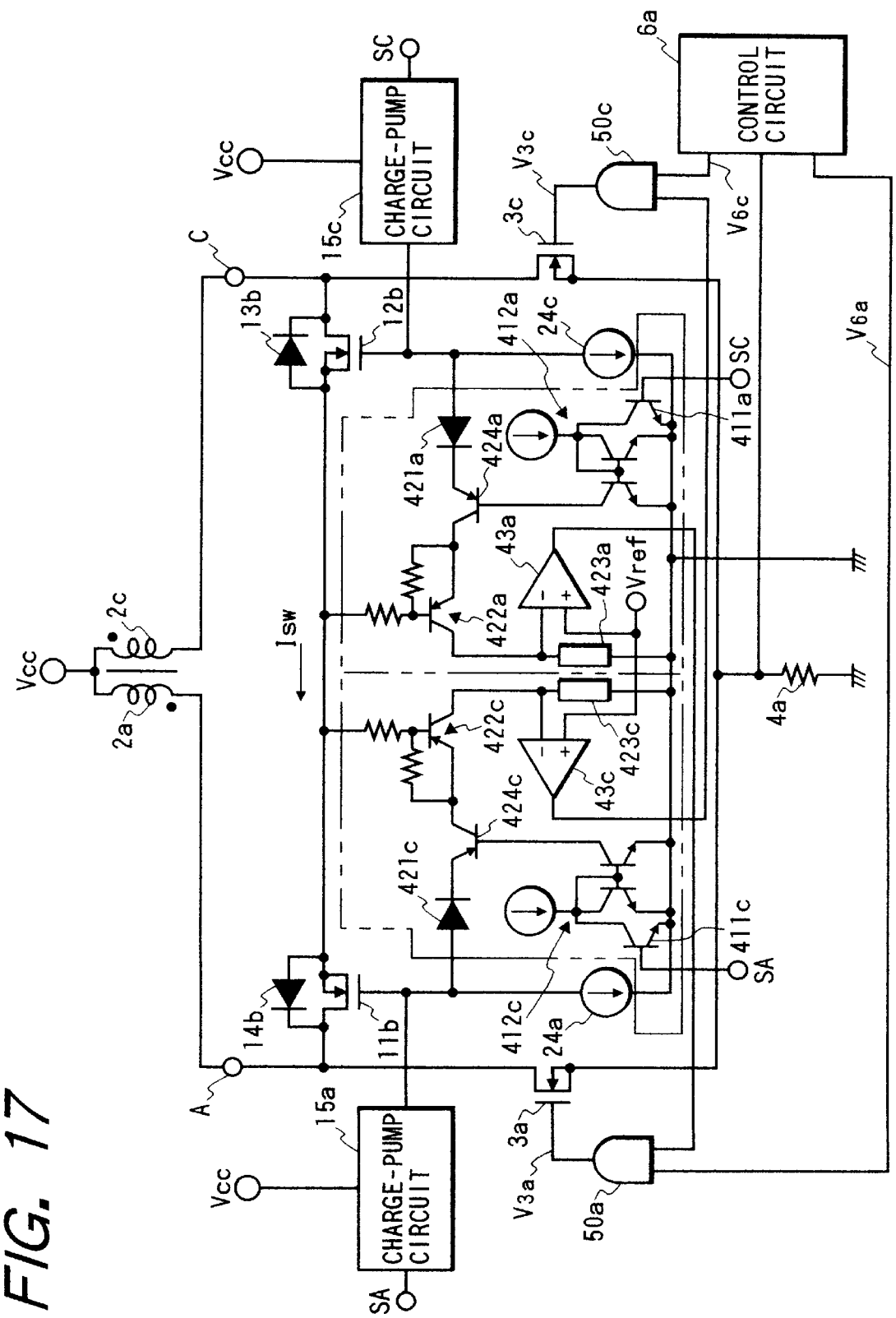
FIG. 17 is a circuit diagram showing another detailed arrangement of the actuation circuit shown in FIG. 16.

Still further, as shown in FIG. 17, switching element 41a and impedance element 425a can be constituted by transistor 411a and current mirror circuit 412a, while switching element 41c and impedance element 425c can be constituted by transistor 411c and current mirror circuit 412c. The arrangement of transistors 411a, 411c and current mirror circuits 412a, 412c are identical with the arrangement shown in FIG. 8.

According to the circuit shown in FIG. 17, when the signal SC is in LOW level (the signal SA is in HIGH level), transistor 411a is turned off and therefore the current mirror circuit 412a starts its operation to turn on transistor 424a and detect the gate-source voltage of MOS transistor 12b. On the contrary, when the signal SA is in LOW level (the signal SC is in HIGH level), transistor 411c is turned off and therefore the current mirror circuit 412c starts its operation to turn on transistor 424c and detect the gate-source voltage of MOS transistor 11b.

Embodiment 5

The above-described fourth embodiment prohibits the switching operation of the coil current until the gate-source voltage of MOS transistor 11b, 12b is reduced to a value near the threshold voltage. Meanwhile, it is preferable to detect the loop current and prohibit the switching operation of the coil current until the detected loop current is reduced to a value below a predetermined value.

Figure 18:
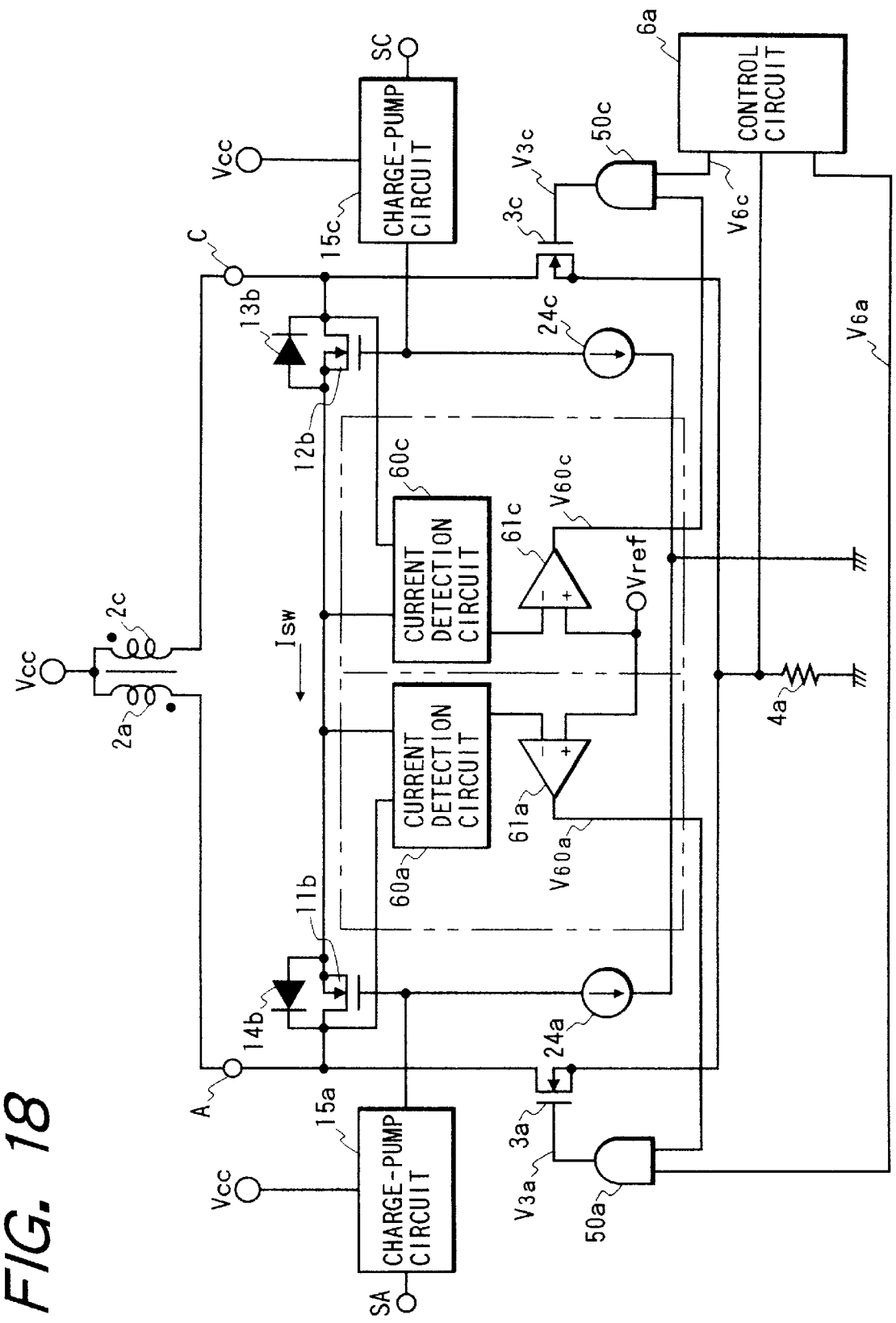
FIG. 18 is a circuit diagram showing an actuation circuit for a stepping motor in accordance with a fifth embodiment of the present invention.
Figure 19:
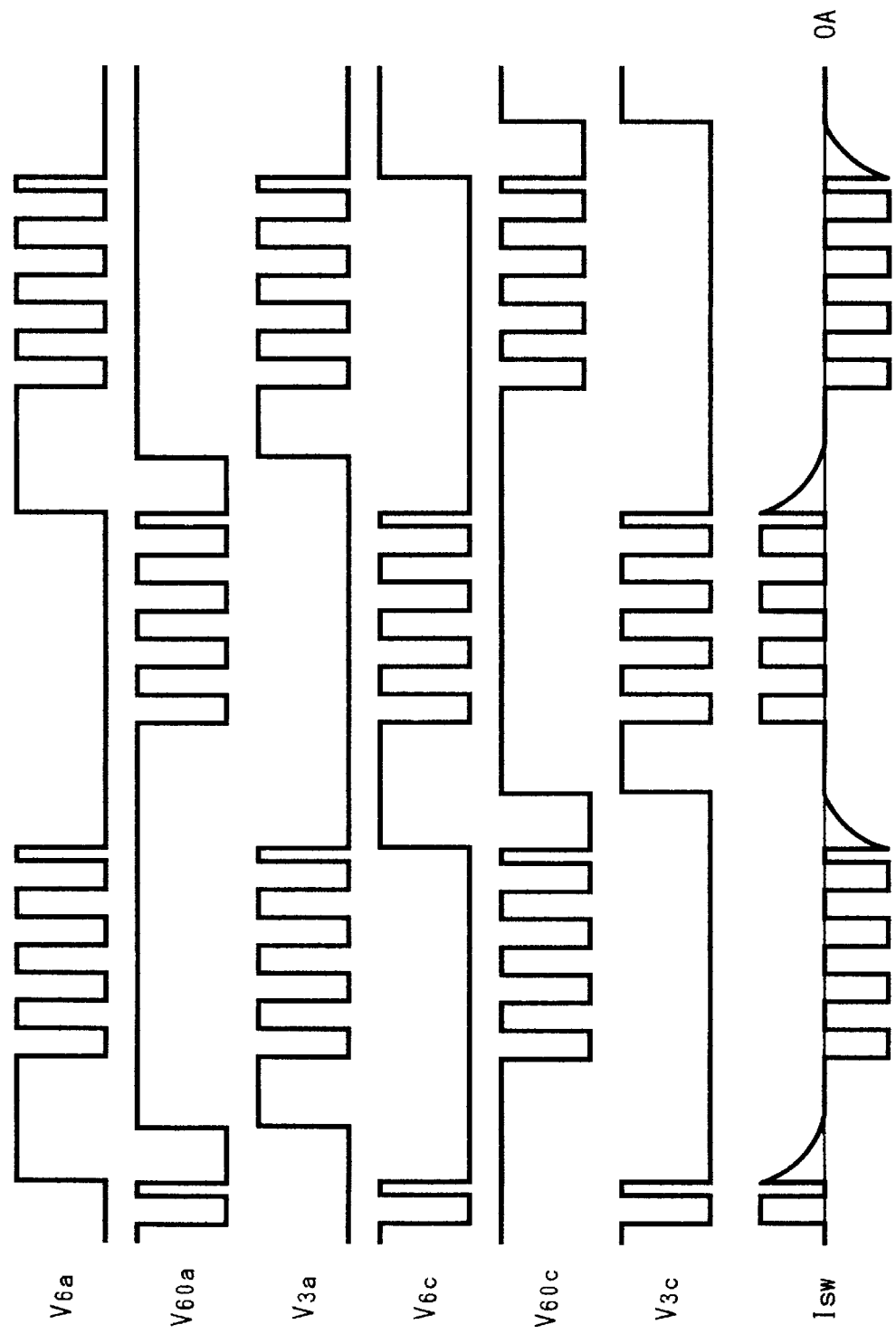
FIG. 19 is a view showing signal waveforms at various portions of the actuation circuit shown in FIG. 18.

FIG. 18 shows the arrangement of the fifth embodiment. FIG. 19 shows the waveforms of various portions of the circuit shown in FIG. 18. The fifth embodiment comprises current detection circuits 60a and 60c for detecting loop current $I_{SW}$.

Current detection circuit 60a, based on the source-drain voltage of MOS transistor 11b, generates a detection voltage having a value corresponding to loop current $I_{SW}$ flowing along the arrow shown in the drawing. Comparator 61a compares the detection voltage with the reference voltage $V_{ref}$ and generates the signal $V_{60a}$ in accordance with the comparison result. As shown in FIG. 19, the signal $V_{60a}$ becomes a LOW-level signal when the detection voltage exceeds the reference voltage $V_{ref}$. In other words, the signal $V_{60a}$ becomes a LOW-level signal when the loop current $I_{SW}$ is flowing along the arrow of FIG. 18. Otherwise, the signal $V_{60a}$ becomes a HIGH-level signal.

When the signal $V_{60a}$ supplied from comparator 61a is in LOW level, AND circuit 50a produces a LOW-level signal to turn off transistor 3a. Accordingly, when the exciting period of coil 2c is switched to the exciting period of coil 2a, the signal $V_{60a}$ produced from comparator 61a is fixed to LOW level until the loop current $I_{SW}$ is reduced to a value below the predetermined value, thereby continuously turning off transistor 3a.

Similarly, current detection circuit 60c, based on the source-drain voltage of MOS transistor 12b, generates a detection voltage having a value corresponding to loop current $I_{SW}$ flowing in the direction opposed to the arrow of FIG. 18. Comparator 61c compares the detection voltage with the reference voltage $V_{ref}$ and generates the signal $V_{60c}$ in accordance with the comparison result. As shown in FIG. 19, the signal $V_{60c}$ becomes a LOW-level signal when the detection voltage exceeds the reference voltage $V_{ref}$. In other words, the signal $V_{60c}$ becomes a LOW-level signal when the loop current $I_{SW}$ is flowing in the opposite direction of the arrow shown in FIG. 18. Otherwise, the signal $V_{60c}$ becomes a HIGH-level signal.

When the signal $V_{60c}$ supplied from comparator 61c is in LOW level, AND circuit 50c produces a LOW-level signal to turn off transistor 3c. Accordingly, when the exciting period of coil 2a is switched to the exciting period of coil 2c, the signal $V_{60c}$ produced from comparator 61c is fixed to LOW level until the loop current $I_{SW}$ is reduced to a value below the predetermined value, thereby continuously turning off transistor 3c.

FIG. 18 is based on the arrangement of FIG. 7, although the components 18a, 18c through 23a, 23c are not disclosed. The arrangement of FIG. 18 can be applied to FIG. 9 or FIG. 10.

Next, the detailed arrangement of current detection circuits 60a and 60c will be explained.

Figure 20:
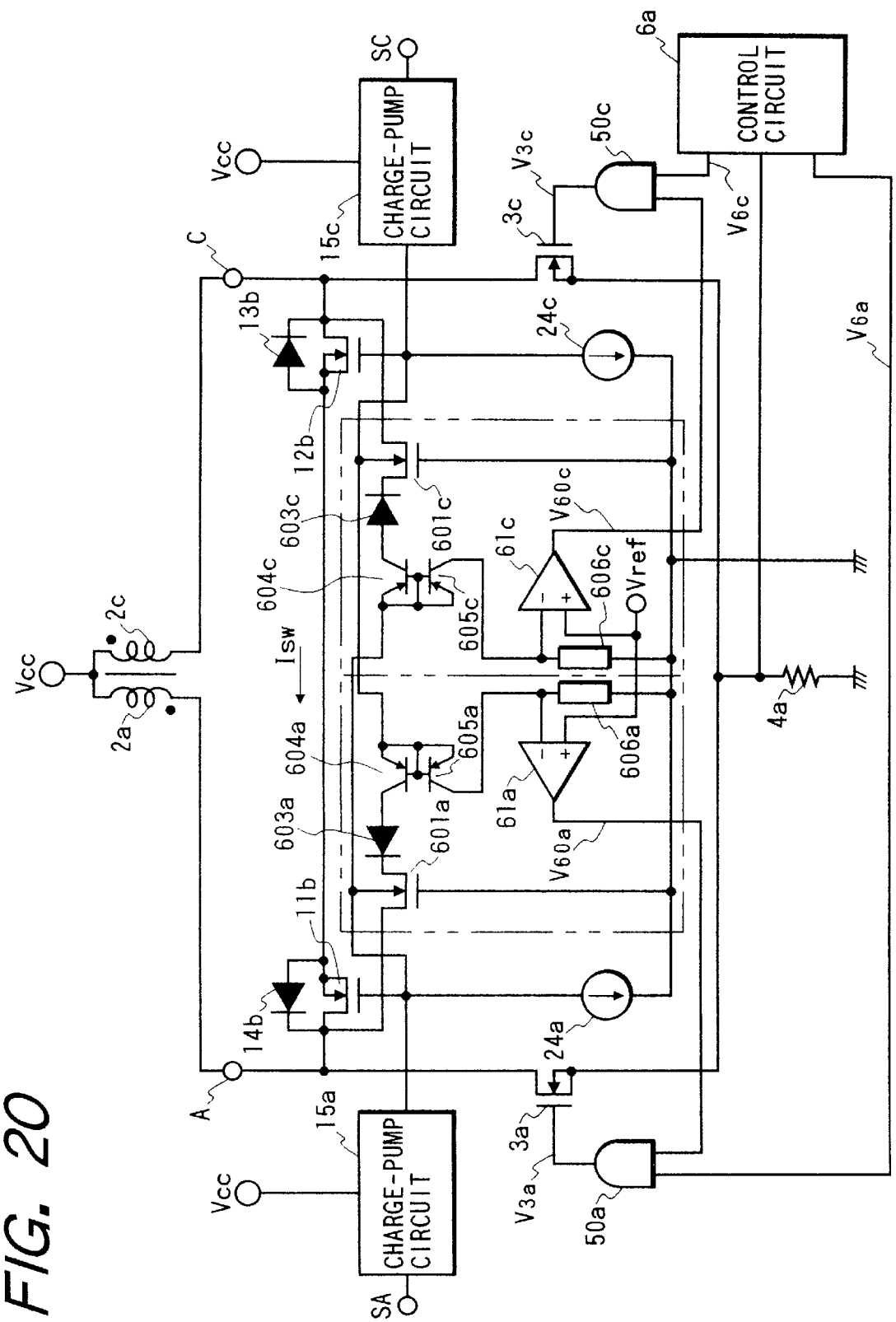
FIG. 20 is a circuit diagram showing another detailed arrangement of the actuation circuit shown in FIG. 18.

FIG. 20 shows the current detection circuits 60a and 60c in more detail. Current detection circuit 60a comprises a MOS transistor 601a connected to the source and the drain of MOS transistor 11b, a rectifying diode 603a, a current mirror circuit consisting of PNP transistors 604a and 605a, and an impedance element 606a.

Figure 21:
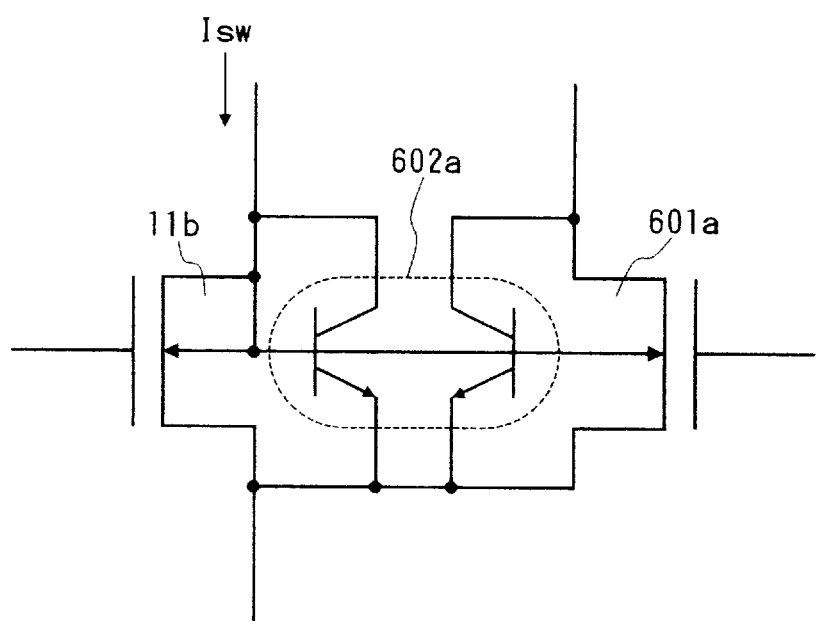
FIG. 21 is a circuit diagram showing a current mirror arrangement adopted in the MOS transistors 11b and 601a shown in FIG. 20.

The source and the drain of MOS transistor 11b are connected to the back gate and the source of MOS transistor 601a, respectively. As a result, as shown in FIG. 21, a current mirror structure 602a is formed in the MOS transistor 11b and MOS transistor 601a by utilizing the parasitic bipolar transistor structure of MOS transistor. The mirror ratio of this current mirror arrangement 602a can be flexibly determined by changing the size of MOS transistors 11b and 601a.

With this arrangement, when the MOS transistor 12b is in an ON condition and the loop current $I_{SW}$ is flowing along the arrow shown in the drawing, MOS transistor 601a receives the current having a value corresponding to the loop current $I_{SW}$ by the source-drain voltage of MOS transistor 11b being in an OFF condition. In this case, this current flows to MOS transistor 601a through charge-pump circuit 15c, PNP transistor 604a, and rectifying diode 603a.

As PNP transistors 604a and 605a constitute a current mirror circuit, the impedance element 606a receives the current having a value corresponding to the current flowing through PNP transistor 604a. Accordingly, the detection voltage corresponding to loop current $I_{SW}$ is produced from one end of the impedance element 606a.

The succeeding operation is similar to that explained with reference to the arrangement shown in FIG. 18. It will be possible to use another power source unit to supply power to PNP transistor 604a, without using charge-pump circuit 15c supplying the gate voltage to the gate of MOS transistor 12b.

Current detection circuit 60c is substantially identical in the arrangement with current detection circuit 60a, as shown by reference numerals 601c through 606c. This current detection circuit 60c generates a detection voltage corresponding to the loop current $I_{SW}$ when the loop current flows in the direction opposed to the arrow of FIG. 20.

Although the above-described fourth and fifth embodiments are basically applied to the second and third embodiments, they will be applied to the first embodiment by incorporating the circuit arrangement detecting the loop current $I_{SW}$ at the time the coil current is switched and prohibiting the switching operation of the coil current until the detected loop current $I_{SW}$ is reduced to a predetermined value.

In this embodiment, the condition where the loop current $I_{SW}$ is reduced to the predetermined value is not limited to the condition where the loop current $I_{SW}$ is completely extinguished and hence it includes the condition where the loop current $I_{SW}$ is reduced to a value closer to 0. This is because the troublesome problem, such as increase of consumption power, is not caused even if the coil current is switched before loop current $I_{SW}$ is completely extinguished, as long as the loop current $I_{SW}$ is in a decreasing stage.

In the same manner, the condition where the gate-source voltage is reduced to a value near the threshold voltage is not limited to the condition where the gate-source voltage is reduced to a value below the threshold voltage and hence it includes the condition where the gate-source voltage is reduced to a value slightly larger than the. threshold voltage.

Furthermore, in the above-described various embodiments, inductance L loads are actuated at their low sides. It is needless to say that the present invention can be applied to inductance L loads actuated at their high sides.

Moreover, the present invention is not limited to the above-described chopper controlled, constant-current load actuation apparatus. For example, the present invention can be applied to a constant-voltage load actuation apparatus which is capable of turning on the switching elements 3a through 3d successively.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. An inductance L load actuating apparatus comprising:
   first and second inductance L loads electromagnetically coupled with each other;
   first and second switching elements respectively connected in series to said first and second inductance L loads; and
   a control circuit coupled to said first and second switching elements for activating one of said first and second switching elements and deactivating the other of said first and second switching elements to actuate said first and second inductance L loads alternately, wherein
      said first inductance L load and said first switching element are connected at a first connecting point, while said second inductance L load and said second switching element are connected at a second connecting point, and
   current path forming means is provided for forming a current path between said first connecting point and said second connecting point when one of said first and second switching elements is changed from an ON condition to an OFF condition, said current path is formed by a voltage difference between said first connecting point and said second connecting point so as to allow current to flow from the connecting point corresponding to said one of first and second switching elements to the connecting point corresponding to the other of said first and second switching elements.

2. The inductance L load actuating apparatus in accordance with claim 1, wherein said control circuit executing a chopping control for one of said first and second switching elements to activate the associated inductance L load, and said current path forming means forms said current path when said one of first and second switching elements being subjected to the chopping control is changed from the ON condition to the OFF condition.

3. The inductance L load actuating apparatus in accordance with claim 1, wherein said current path forming means comprises first switching means which is turned on in response to the actuation of said first switching element, and second switching means which is turned on in response to the actuation of said second switching element.

4. The inductance L load actuating apparatus in accordance with claim 3, wherein said current path forming means further comprises first rectifying means which rectifies the current to flow from said first connecting point to said second connecting point when said first switching means is turned on, and second rectifying means which rectifies the current to flow from said second connecting point to said first connecting point when said second switching means is turned on.

5. The inductance L load actuating apparatus in accordance with claim 4, wherein said first and second switching means are constituted by first and second MOS transistors, and first and second diodes incorporated in said first and second MOS transistors serve as said first and second rectifying means.

6. The inductance L load actuating apparatus in accordance with claim 5, further comprising potential fixing means which fixes an electrical potential of a connecting point between said first and second MOS transistors.

7. The inductance L load actuating apparatus in accordance with claim 5, further comprising charging means which charges the gate of said first MOS transistor by using the voltage of said second connecting point when said first switching element is turned on, and also charges the gate of said second MOS transistor by using the voltage of said first connecting point when said second switching element is turned on.

8. The inductance L load actuating apparatus in accordance with claim 7, further comprising discharging means which grounds the gate of said second MOS transistor when said first switching element is in an activated condition, and also grounds the gate of said first MOS transistor when said second switching element is in an activated condition.

9. The inductance L load actuating apparatus in accordance with claim 5, wherein said first and second inductance L loads are exciting coils, and prohibition means is provided to prevent one of said first and second switching elements from being activated until the gate voltage of one of said first and second MOS transistors having been in the ON condition is reduced to a value near a predetermined threshold voltage, at the time the exciting coils are switched by switching said one of said first and second switching elements from a deactivated condition to an activated condition and switching the other of said first and second switching elements from an activated condition to a deactivated condition.

10. The inductance L load actuating apparatus in accordance with claim 5, wherein said first and second inductance L loads are exciting coils, and prohibition means is provided to prevent one of said first and second switching elements from being activated until the current flowing through said current path is reduced to a predetermined value by the source-drain voltage of one of said first and second MOS transistors being in the OFF condition, at the time the exciting coils are switched by switching said one of said first and second switching elements from a deactivated condition to an activated condition and switching the other of said first and second switching elements from an activated condition to a deactivated condition.

11. The inductance L load actuating apparatus in accordance with claim 1, wherein said first and second inductance L loads are exciting coils, and prohibition means is provided to prevent one of said first and second switching elements from being activated until the current flowing through said current path is reduced to a predetermined value, at the time the exciting coils are switched by switching said one of said first and second switching elements from a deactivated condition to an activated condition and switching the other of said first and second switching elements from an activated condition to a deactivated condition.

* * * * *